(12) United States Patent
Ikeda

(10) Patent No.: US 9,979,913 B2
(45) Date of Patent: May 22, 2018

(54) DRIVING METHOD OF IMAGING DEVICE AND DRIVING METHOD OF IMAGING SYSTEM

(71) Applicant: CANON KABUSHIKI KAISHA, Tokyo (JP)

(72) Inventor: Yasuji Ikeda, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days. days.

(21) Appl. No.: 15/363,352

(22) Filed: Nov. 29, 2016

(65) Prior Publication Data

US 2017/0078601 A1 Mar. 16, 2017

Related U.S. Application Data

(63) Continuation of application No. 14/469,167, filed on Aug. 26, 2014, now Pat. No. 9,538,110.

(30) Foreign Application Priority Data

Aug. 28, 2013 (JP) .................................. 2013-176246

(51) Int. Cl.
| | |
|---|---|
| *H04N 5/369* | (2011.01) |
| *H04N 5/347* | (2011.01) |
| *H04N 5/3745* | (2011.01) |
| *H04N 5/378* | (2011.01) |
| *G02B 7/34* | (2006.01) |
| *H04N 5/232* | (2006.01) |

(52) U.S. Cl.
CPC ............. *H04N 5/3696* (2013.01); *G02B 7/34* (2013.01); *H04N 5/23212* (2013.01); *H04N 5/347* (2013.01); *H04N 5/378* (2013.01); *H04N 5/37457* (2013.01)

(58) Field of Classification Search
CPC .. H04N 5/3696; H04N 5/23212; H04N 5/347; H04N 5/357; H04N 5/374; H04N 5/3741; H04N 5/3742; H04N 5/3743; H04N 5/3745; H04N 5/37452; H04N 5/37455; H04N 5/37457; H04N 5/378; G02B 7/34; H01L 27/14609; H01L 27/14612; H01L 27/14625
See application file for complete search history.

(56) References Cited

U.S. PATENT DOCUMENTS

| 9,538,110 B2 * | 1/2017 | Ikeda ..................... H04N 5/347 |
| 9,648,266 B2 * | 5/2017 | Yamasaki .......... H04N 5/37452 |

(Continued)

FOREIGN PATENT DOCUMENTS

| JP | 2003-156677 A | 5/2003 |
| JP | 2011-250325 A | 12/2011 |

(Continued)

*Primary Examiner* — Tom Sheng
(74) *Attorney, Agent, or Firm* — Canon U.S.A., Inc. IP Division

(57) ABSTRACT

A driving method of an imaging device, and a driving method of an imaging system set the number of unit cells based on signals output from a plurality of unit cells in a phase difference detection area within an imaging area to a number larger than the number of unit cells based on signals output from a plurality of unit cells in a range other than the phase difference detection area within the imaging area.

12 Claims, 17 Drawing Sheets

(56) References Cited

U.S. PATENT DOCUMENTS

| | | | | |
|---|---|---|---|---|
| 2002/0036257 | A1* | 3/2002 | Yamashita | H04N 5/23212 250/208.1 |
| 2012/0050597 | A1* | 3/2012 | Maeda | H04N 5/23212 348/326 |
| 2012/0050598 | A1* | 3/2012 | Kinugasa | H01L 27/14641 348/327 |
| 2012/0300104 | A1* | 11/2012 | Onuki | H04N 5/23212 348/302 |
| 2013/0021519 | A1* | 1/2013 | Hamada | G03B 13/36 348/349 |
| 2013/0141618 | A1* | 6/2013 | Kobayashi | H04N 5/23241 348/301 |
| 2013/0181309 | A1* | 7/2013 | Johnson | H01L 31/02002 257/431 |
| 2013/0194471 | A1* | 8/2013 | Yamashita | H04N 5/374 348/308 |
| 2013/0234027 | A1* | 9/2013 | Kurokawa | H01L 27/14643 250/338.4 |
| 2013/0235237 | A1* | 9/2013 | Aoki | H01L 27/14625 348/294 |
| 2014/0118610 | A1* | 5/2014 | Ohara | H04N 5/23212 348/349 |
| 2014/0320735 | A1* | 10/2014 | Ikedo | H04N 5/3696 348/350 |
| 2014/0332661 | A1* | 11/2014 | Fukuda | H04N 5/23212 250/201.7 |

FOREIGN PATENT DOCUMENTS

| | | | |
|---|---|---|---|
| JP | 2012-191400 A | 10/2012 | |
| JP | 2012-230172 A | 11/2012 | |

* cited by examiner

FIG. 5A
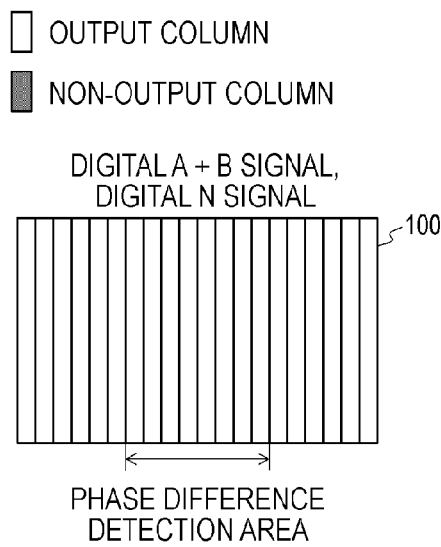
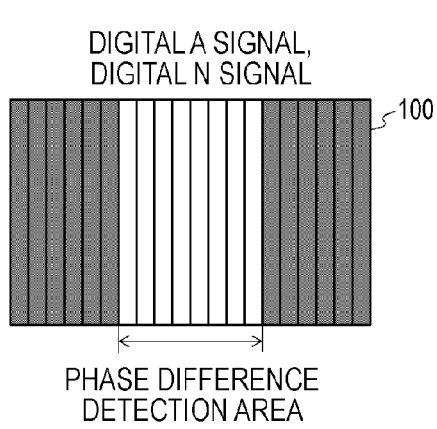
FIG. 5B
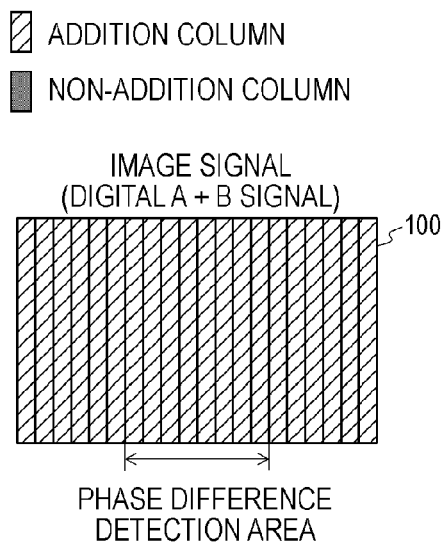
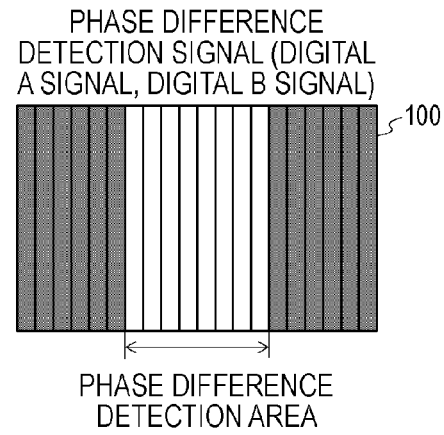

FIG. 6A

☐ NON-ADDITION COLUMN
▨ ADDITION COLUMN
▩ NON-OUTPUT COLUMN

DIGITAL A + B SIGNAL,
DIGITAL N SIGNAL

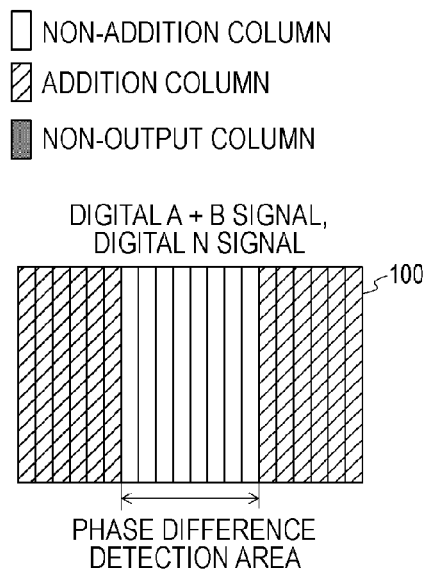

PHASE DIFFERENCE
DETECTION AREA

DIGITAL A SIGNAL,
DIGITAL N SIGNAL

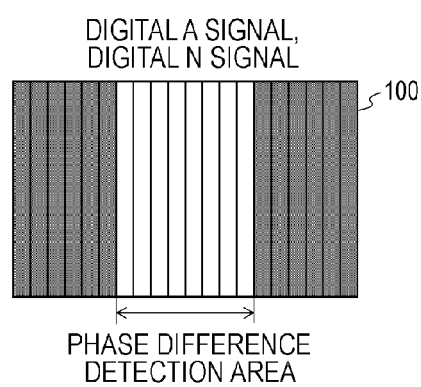

PHASE DIFFERENCE
DETECTION AREA

FIG. 6B

☐ OUTPUT COLUMN
▩ NON-OUTPUT COLUMN
▨ ADDITION COLUMN

IMAGE SIGNAL
(DIGITAL A + B SIGNAL)

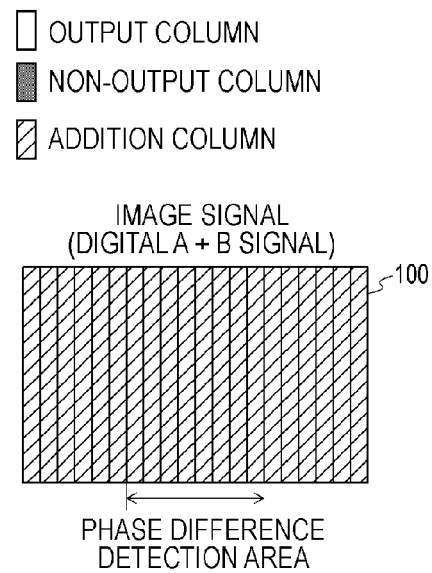

PHASE DIFFERENCE
DETECTION AREA

PHASE DIFFERENCE
DETECTION SIGNAL (DIGITAL
A SIGNAL, DIGITAL B SIGNAL)

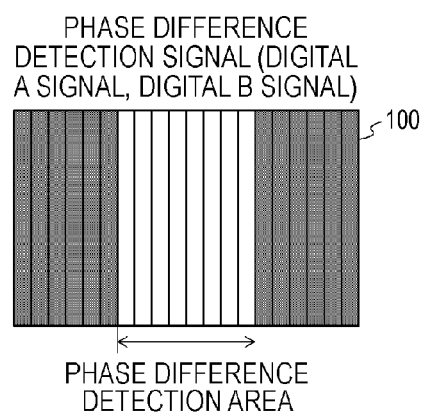

PHASE DIFFERENCE
DETECTION AREA

FIG. 8A

☐ OUTPUT COLUMN
▨ NON-OUTPUT COLUMN

DIGITAL A + B SIGNAL,
DIGITAL N SIGNAL

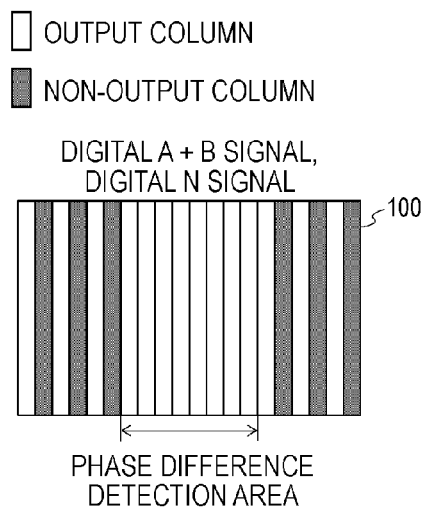

PHASE DIFFERENCE
DETECTION AREA

DIGITAL A SIGNAL,
DIGITAL N SIGNAL

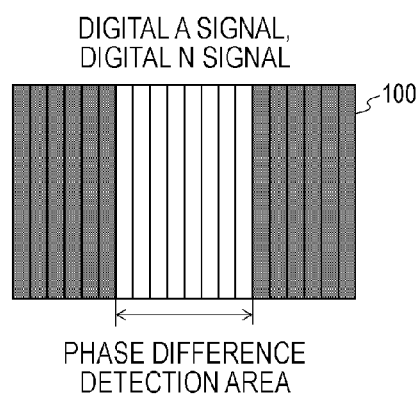

PHASE DIFFERENCE
DETECTION AREA

FIG. 8B

☐ OUTPUT COLUMN
▨ NON-OUTPUT COLUMN

IMAGE SIGNAL
(DIGITAL A + B SIGNAL)

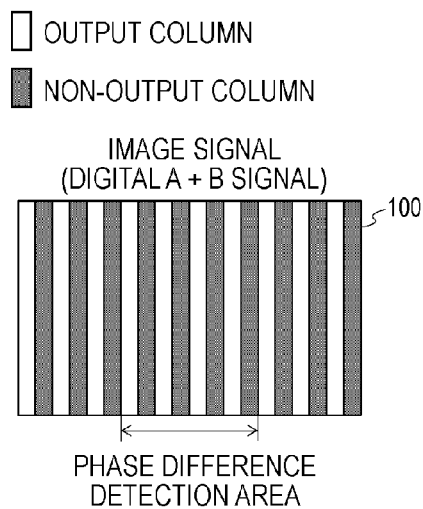

PHASE DIFFERENCE
DETECTION AREA

PHASE DIFFERENCE DETECTION
SIGNAL (DIGITAL A SIGNAL,
DIGITAL B SIGNAL)

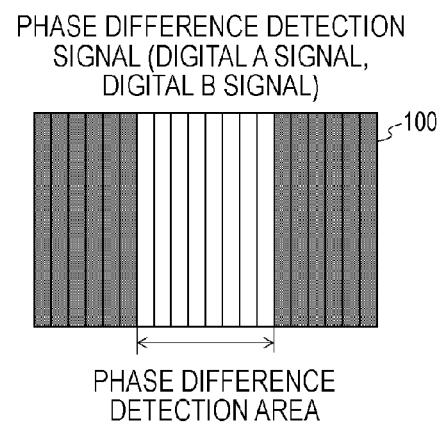

PHASE DIFFERENCE
DETECTION AREA

FIG. 9A

☐ OUTPUT PIXEL OF DIGITAL SIGNAL CORRESPONDING TO PIXEL SIGNAL

▨ NON-OUTPUT PIXEL OF DIGITAL SIGNAL CORRESPONDING TO PIXEL SIGNAL

DIGITAL A + B SIGNAL, DIGITAL N SIGNAL

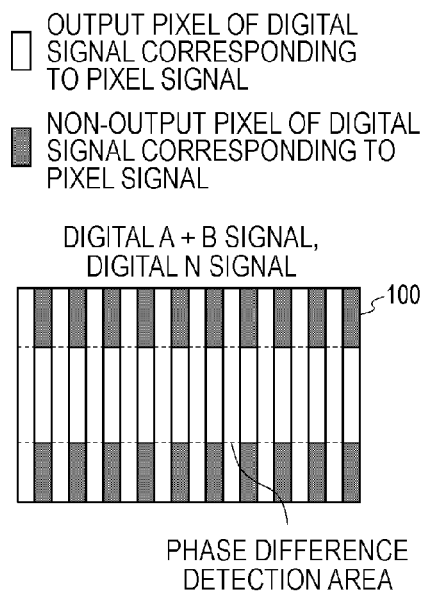

PHASE DIFFERENCE DETECTION AREA

DIGITAL A SIGNAL, DIGITAL N SIGNAL

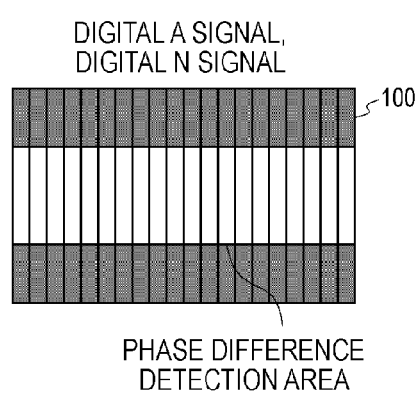

PHASE DIFFERENCE DETECTION AREA

FIG. 9B

☐ PIXEL CORRESPONDING TO SIGNAL GENERATED BY SIGNAL PROCESSING UNIT

▨ PIXEL NOT CORRESPONDING TO SIGNAL GENERATED BY SIGNAL PROCESSING UNIT

IMAGE SIGNAL (DIGITAL A + B SIGNAL)

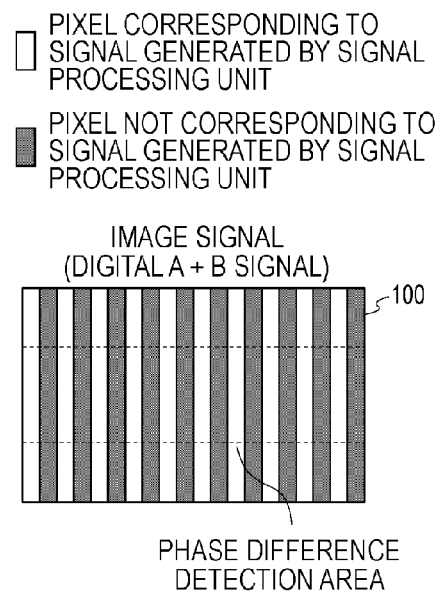

PHASE DIFFERENCE DETECTION AREA

PHASE DIFFERENCE DETECTION SIGNAL (DIGITAL A SIGNAL, DIGITAL B SIGNAL)

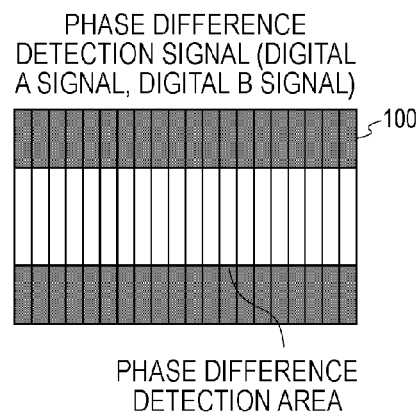

PHASE DIFFERENCE DETECTION AREA

FIG. 10A

☐ OUTPUT PIXEL OF DIGITAL SIGNAL CORRESPONDING TO PIXEL SIGNAL

▓ NON-OUTPUT PIXEL OF DIGITAL SIGNAL CORRESPONDING TO PIXEL SIGNAL

DIGITAL A + B SIGNAL, DIGITAL N SIGNAL

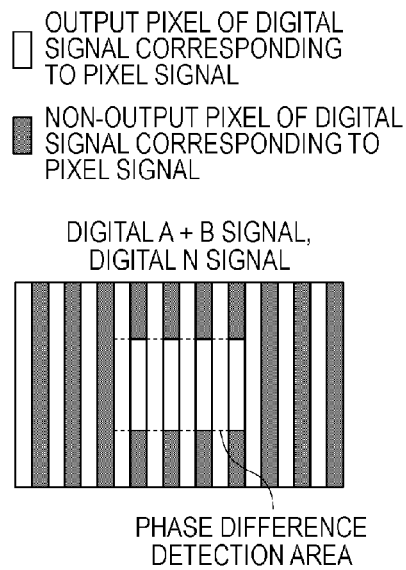

PHASE DIFFERENCE DETECTION AREA

DIGITAL A SIGNAL, DIGITAL N SIGNAL

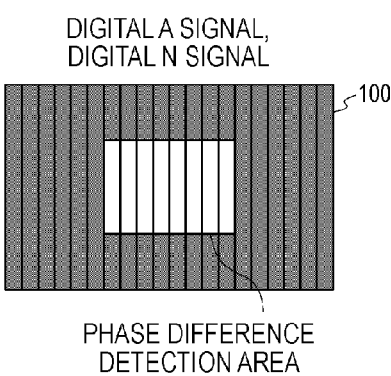

PHASE DIFFERENCE DETECTION AREA

FIG. 10B

☐ PIXEL CORRESPONDING TO SIGNAL GENERATED BY SIGNAL PROCESSING UNIT

▓ PIXEL NOT CORRESPONDING TO SIGNAL GENERATED BY SIGNAL PROCESSING UNIT

IMAGE SIGNAL (DIGITAL A + B SIGNAL)

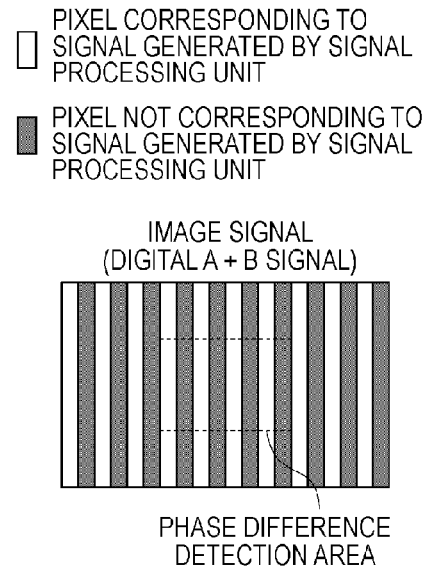

PHASE DIFFERENCE DETECTION AREA

PHASE DIFFERENCE DETECTION SIGNAL (DIGITAL A SIGNAL, DIGITAL B SIGNAL)

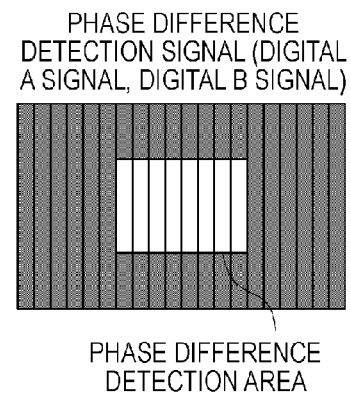

PHASE DIFFERENCE DETECTION AREA

FIG. 11A

☐ NON-ADDITION COLUMN

▨ BETWEEN-COLUMN ADDITION COLUMN    ▨ BETWEEN-LINE ADDITION COLUMN

▓ NON-OUTPUT COLUMN

DIGITAL A + B SIGNAL, DIGITAL N SIGNAL

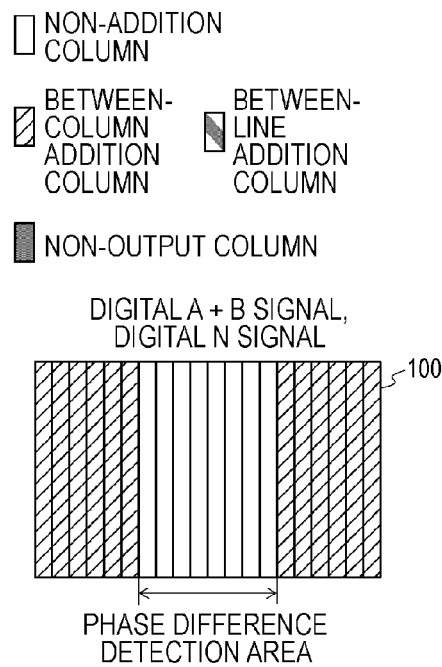

PHASE DIFFERENCE DETECTION AREA

DIGITAL A SIGNAL, DIGITAL N SIGNAL

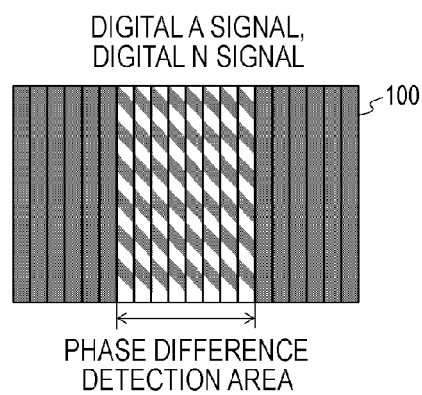

PHASE DIFFERENCE DETECTION AREA

FIG. 11B

▨ BETWEEN-COLUMN ADDITION COLUMN    ▨ BETWEEN-LINE ADDITION COLUMN

▓ NON-OUTPUT COLUMN

IMAGE SIGNAL (DIGITAL A + B SIGNAL)

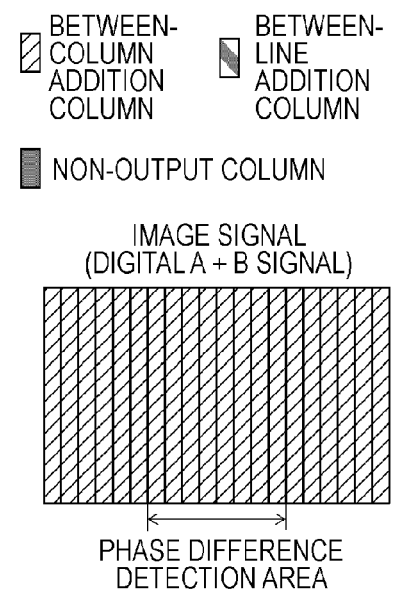

PHASE DIFFERENCE DETECTION AREA

PHASE DIFFERENCE DETECTION SIGNAL (DIGITAL A SIGNAL; DIGITAL B SIGNAL)

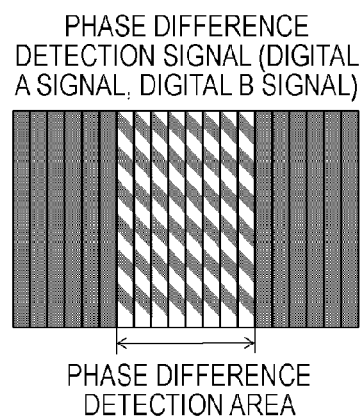

PHASE DIFFERENCE DETECTION AREA

DRIVING METHOD OF IMAGING DEVICE AND DRIVING METHOD OF IMAGING SYSTEM

CROSS-REFERENCE TO RELATED APPLICATION

This application is a Continuation of U.S. application Ser. No. 14/469,167, filed Aug. 26, 2014, which claims priority from Japanese Patent Application No. 2013-176246, filed Aug. 28, 2013, which are hereby incorporated by reference herein in their entireties.

BACKGROUND OF THE INVENTION

Field of the Invention

The present invention relates to an imaging device which includes pixels disposed in a matrix, and each including a plurality of photoelectric converting units.

Description of the Related Art

An imaging device known in the art includes pixels disposed in a matrix, and each including a plurality of photoelectric converting units below a microlens.

An imaging device disclosed in Japanese Patent Application Laid-Open No. 2012-191400 detects the phase difference of incident light based on signals generated based on respective electric carriers accumulated in a first one and a second one of a plurality of photoelectric converting units disposed below a microlens. The imaging device disclosed in Japanese Patent Application Laid-Open No. 2012-191400 forms an image based on signals generated based on electric carriers accumulated in the plural photoelectric converting units.

SUMMARY OF THE INVENTION

A first aspect of the embodiments is directed to a driving method of an imaging device which includes a plurality of unit cells disposed in a matrix in an imaging area, and each including a plurality of photoelectric converting units each accumulating an electric carriers based on incident light. Each of the plurality of unit cells positioned in a first area for phase difference detection within the imaging area outputs a first signal based on the electric carriers accumulated in a first one of the plurality of photoelectric converting units, and a second signal based on the sum of the electric carriers accumulated in the plurality of photoelectric converting units. Each of the plurality of unit cells positioned in a second area other than the first area within the imaging area outputs the second signal. The imaging device outputs signals based on the first signals in the first area, and signals based on the second signals in the first area. The imaging device outputs signals based on the second signals in the second area. The imaging device sets the number of the unit cells based on a signal based on one of the second signals in the second area to a number larger than the number of the unit cells based on a signal based on one of the first signals in the first area, and larger than the number of the unit cells based on a signal based on one of the second signals in the first area.

A second aspect of the embodiments is directed to a driving method of an imaging device which includes a plurality of unit cells disposed in a matrix in an imaging area, and each including a plurality of photoelectric converting units each accumulating electric carriers based on incident light. Each of the plurality of unit cells outputs a first signal based on the electric carriers accumulated in a first one of the plurality of photoelectric converting units, and a second signal based on the electric carriers accumulated in a second one of the plurality of photoelectric converting units. The imaging device outputs signals based on the first signals of the unit cells in the imaging area, and signals based on the second signals of the unit cells in the imaging area. The imaging device sets each of the number of the unit cells based on a signal based on one of the first signals in the first area for phase difference detection within the imaging area and the number of the unit cells based on a signal based on one of the second signals in the first area to a number larger than the number of the unit cells based on a signal based on one of the second signals in a second area other than the first area within the imaging area.

A third aspect of the embodiments is directed to a driving method of an imaging system which includes the imaging device of the first aspect of the invention, and a signal processing unit receiving signals from the imaging device. The signal processing unit generates phase difference detection signals using signals based on the first signals of the unit cells within the first area, and signals based on the second signals of the unit cells within the first area. The signal processing unit generates image signals for producing an image using signals based on the second signals of the unit cells within the imaging area.

A fourth aspect of the embodiments is directed to a driving method of an imaging system which includes the imaging device of the second aspect of the invention, and a signal processing unit receiving signals from the imaging device. The signal processing unit generates phase difference detection signals using signals based on the first signals of the unit cells within the first area, and signals based on the second signals of the unit cells within the first area. The signal processing unit generates image signals for producing an image using signals based on the second signals of the unit cells within the imaging area.

A fifth aspect of the embodiments is directed to a driving method of an imaging system. The imaging system includes an imaging device including a plurality of unit cells disposed in a matrix in an imaging area, each of the unit cells including a plurality of photoelectric converting units each accumulating electric carriers based on incident light. The imaging system further includes a signal processing unit processing signals output from the imaging device. Each of the plurality of unit cells positioned in a first area for phase difference detection within the imaging area outputs a first signal based on the electric carriers accumulated in a first one of the plurality of photoelectric converting units, and a second signal based on the sum of the electric carriers accumulated in the plurality of photoelectric converting units. Each of the plurality of unit cells positioned in a second area other than the first area within the imaging area outputs the second signal. The imaging device outputs signals based on the first signals in the first area, signals based on the second signals in the first area, and signals based on the second signals in the second area to the signal processing unit. The signal processing unit generates phase difference detection signals based on signals based on the first signals in the first area, and signals based on the second signals in the first area, and further generates image signals for producing an image using signals obtained by adding respective signals based on the second signals in the imaging area, or using signals based on a part of the second signals in the imaging area input from the imaging device.

A sixth aspect of the embodiments is directed to a driving method of an imaging system. The imaging system includes an imaging device including a plurality of unit cells disposed in a matrix in an imaging area, each of the unit cells including a plurality of photoelectric converting units each accumulating electric carriers based on incident light. The imaging system further includes a signal processing unit processing signals output from the imaging device. Each of the plurality of unit cells outputs a first signal based on the electric carriers accumulated in a first one of the plurality of photoelectric converting units, and a second signal based on the electric carriers accumulated in a second one of the plurality of photoelectric converting units. The imaging device outputs signals based on the first signals of the unit cells within the imaging area, and signals based on the second signals of the unit cells within the imaging area to the signal processing unit. The signal processing unit generates phase difference detection signals based on signals based on the first signals of the unit cells within the first area in the imaging area, and signals based on the second signals of the unit cells within the first area in the imaging area. The signal processing unit generates image signals for producing an image using signals obtained by adding respective signals based on the first signals in the imaging area and respective signals based on the second signals in the imaging area, or using signals based on a part of the first signals and second signals in the imaging area input from the imaging device.

A seventh aspect of the embodiments is directed to a driving method of an imaging system. The imaging system includes an imaging device including a plurality of unit cells disposed in a matrix in an imaging area, each of the unit cells including a plurality of photoelectric converting units each accumulating electric carriers based on incident light. The imaging system further includes a signal processing unit processing signals output from the imaging device. Each of the plurality of unit cells positioned in a first area for phase difference detection within the imaging area outputs a first signal based on the electric carriers accumulated in a first one of the plurality of photoelectric converting units, and a second signal based on the sum of the electric carriers accumulated in the plurality of photoelectric converting units. Each of the plurality of unit cells positioned in a second area other than the first area within the imaging area outputs the second signal. Each of the plurality of unit cells positioned in a second area other than the first area within the imaging area outputs the second signal. The signal processing unit generates phase difference detection signals based on signals based on the first signals in the first area and signals based on the second signals in the first area, and further generates image signals for producing an image based on signals based on the second signals in the imaging area. The imaging device sets the number of the unit cells based on one of the image signals to a number larger than the number of the unit cells based on one of the phase difference detection signals.

Further features of the disclosure will become apparent from the following description of exemplary embodiments (with reference to the attached drawings).

BRIEF DESCRIPTION OF THE DRAWINGS

FIGS. 5A and 5B show an example of signals output from the imaging device, and an example of signals output from a signal processing unit, respectively.

FIGS. 6A and 6B show an example of signals output from an imaging device, and an example of signals output from a signal processing unit, respectively.

FIGS. 8A and 8B show an example of signals output from an imaging device, and an example of signals output from a signal processing unit, respectively.

FIGS. 9A and 9B show an example of signals output from an imaging device, and an example of signals output from a signal processing unit, respectively.

FIGS. 10A and 10B show an example of signals output from an imaging device, and an example of signals output from a signal processing unit, respectively.

FIGS. 11A and 11B show an example of signals output from an imaging device, and an example of signals output from a signal processing unit, respectively.

DESCRIPTION OF THE EMBODIMENTS

Japanese Patent Application Laid-Open No. 2012-191400 does not propose any solution to the problem that the accuracy of phase difference detection lowers in proportion to reduction of the resolution of an image formed based on signals output from the imaging device. Accordingly, provided herein is a technology capable of preventing lowering of the accuracy of phase difference detection caused by reduction of the resolution of an image formed based on signals output from an imaging device.

Exemplary embodiments are hereinafter described with reference to the drawings.

First Embodiment

Figure 1:
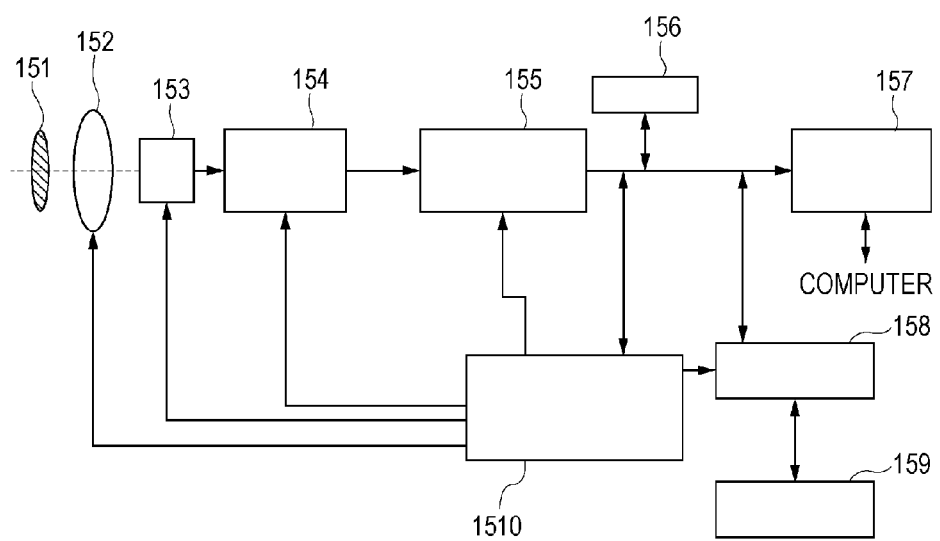
FIG. 1 illustrates a structure example of an imaging system.

FIG. 1 is a diagram showing the structure of an imaging system according to this embodiment.

As illustrated in FIG. 1, the imaging system includes a barrier 151 for protecting a lens, a lens 152 focusing an optical image of an object on an imaging device 154, and a diaphragm 153 for varying the amount of light transmitted through the lens 152. The imaging system further includes a signal processing unit 155 processing signals output from the imaging device 154. Signals output from the imaging device 154 are imaging signals generated for formation of an image of the object to be shot. The signal processing unit 155 corrects or compresses the imaging signals output from the imaging device 154 in various ways as necessary to produce image signals. The lens 152 and the diaphragm 153 constitute an optical system converging light on the imaging device 154.

The imaging system shown in FIG. 1 as an example further includes a buffer memory unit 156 for temporary storage of image data, and an external interface unit 157 for communication with an external computer or the like. The imaging system further includes a detachably mounted recording medium 159 such as a semiconductor memory to which imaging data is recorded or from which imaging data is read, and a recording medium control interface unit 158 through which imaging data is recorded to or read from the recording medium 159. The imaging system further includes an overall control/calculation unit 1510 performing various calculations and overall control of a digital camera.

Figure 2:
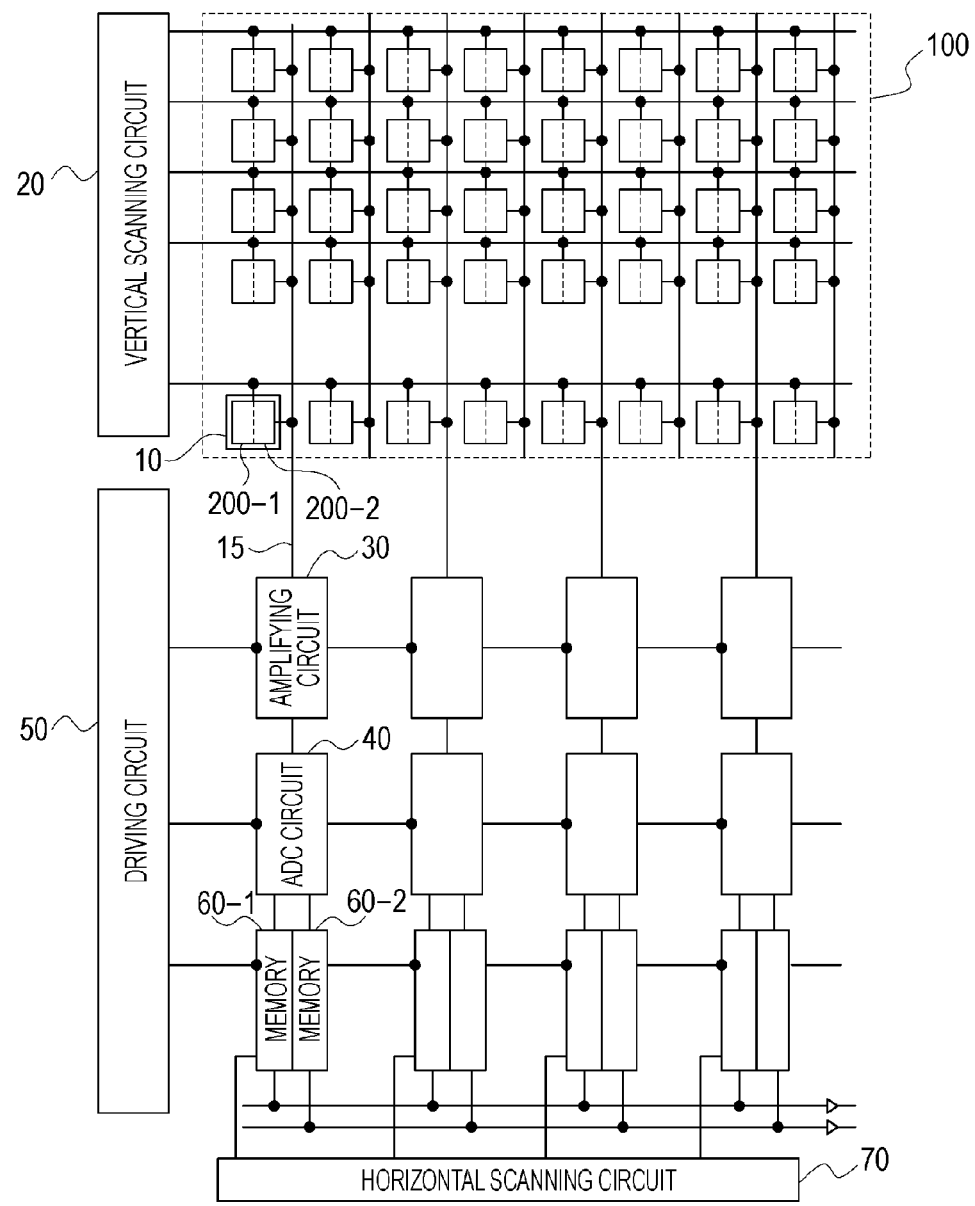
FIG. 2 illustrates a structure example of an imaging device.

FIG. 2 is a diagram showing the structure of the imaging device included in the imaging system according to this embodiment.

The imaging device according to this embodiment includes a pixel array 100 including pixels 10 disposed in a matrix. Each of the pixels 10 includes photoelectric converting units 200-1 and 200-2. One unit cell in this embodiment corresponds to the one pixel 10.

A vertical scanning circuit 20 selects the pixels 10 row by row, and causes the respective pixels 10 of the selected row to output signals to an amplifying circuit 30 via a corresponding vertical signal line 15.

The amplifying circuit 30 is an amplifying unit which amplifies signals input from the pixels 10 in the respective columns via the vertical signal line 15, and generates amplified signals under the control of a driving circuit 50. The amplifying circuit 30 outputs the amplified signals to an ADC circuit 40. The ADC circuit 40 is an AD converting unit which converts signals input from the amplifying circuit 30 into digital signals.

Each of a memory 60-1 and a memory 60-2 holds digital signals input from the ADC circuit 40 under the control of the driving circuit 50.

A horizontal scanning circuit 70 causes the memory 60-1 and the memory 60-2 to output signals column by column in the arrangement of the pixels 10.

Figure 3:
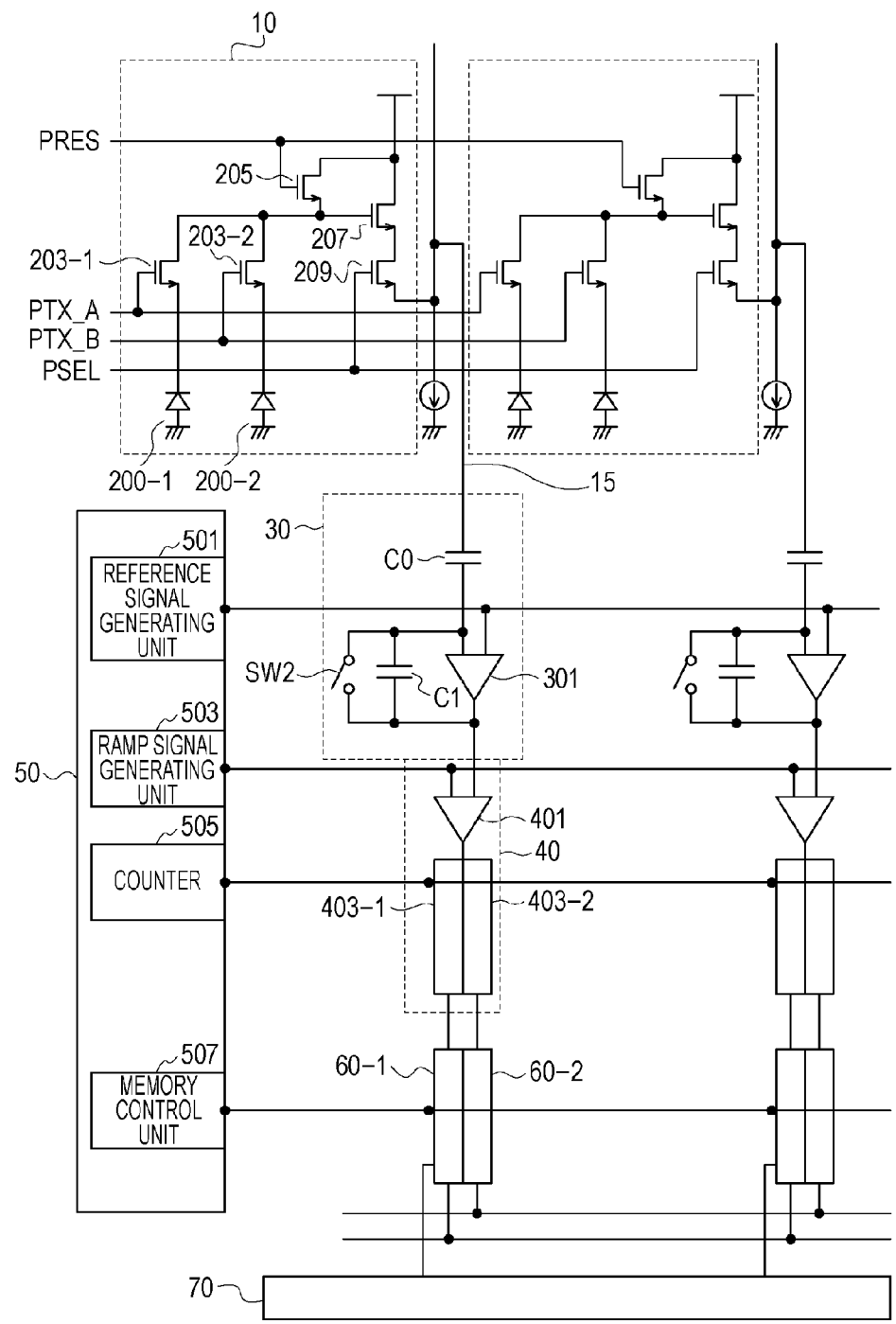
FIG. 3 illustrates a structure example of the imaging device.

FIG. 3 illustrates the details of the pixels 10, the amplifying circuit 30, the ADC circuit 40, and the driving circuit 50. Each of the pixels 10 includes the photoelectric converting units 200-1 and 200-2, transistors 203-1 and 203-2, a transistor 205, a transistor 207, and a transistor 209.

The conductive and non-conductive states of the transistors 203-1 and 203-2 are controlled by signals PTX_A and PTX_B, respectively, input from the vertical scanning circuit 20. The conductive and non-conductive states of the transistor 205 are controlled by a signal PRES input from the vertical scanning circuit 20. The transistor 209 is controlled by a signal PSEL input from the vertical scanning circuit 20.

When the transistor 203-1 comes into the conductive state, the electric carriers accumulated in the photoelectric converting unit 200-1 is transferred to the input node of the transistor 207. When the transistor 203-2 comes into the conductive state, the electric carriers accumulated in the photoelectric converting unit 200-2 are transferred to the input node of the transistor 207.

The transistor 207 outputs a signal based on the potential of the input node of the transistor 207 to the transistor 209. The transistor 207 is an output unit which outputs signals based on the electric carriers of the photoelectric converting unit 200-1 and 200-2. When the transistor 209 comes into the conductive state, the signal received from the transistor 207 is output to the vertical signal line 15.

The amplifying circuit 30 includes a switch SW2, an inverting amplifier 301, and capacitor elements C0 and C1. The driving circuit 50 controls the conductive and non-conductive states of the switch SW2. A reference signal generating unit 501 included in the driving circuit 50 supplies a reference signal VREF to the inverting amplifier 301. The signal input to the vertical signal line 15 is further input to the inverting amplifier 301 via the capacitor element C0. The inverting amplifier 301 amplifies the signal received from the vertical signal line 15 via the capacitor element C0, and outputs the amplified signal to a comparator 401 included in the ADC circuit 40. When the driving circuit 50 brings the switch SW2 into the conductive state, the electric carriers in the capacitor elements C0 and C1 are reset.

The ADC circuit 40 includes the comparator 401 and count signal holding units 403-1 and 403-2. A ramp signal generating unit 503 outputs a ramp signal RAMP to the comparator 401. The ramp signal RAMP is a signal the potential of which changes depending on time. The comparator 401 outputs to the count signal holding units 403-1 and 403-2 a comparison result signal CMP indicating the result of comparison between the ramp signal and the signal output from the inverting amplifier 301. A counter 505 outputs a count signal indicating the count of clock pulses to the count signal holding units 403-1 and 403-2. Each of the count signal holding units 403-1 and 403-2 holds a count signal output from the counter 505 when the signal value of the comparison result signal CMP varies.

A memory control unit 507 included in the driving circuit 50 causes the memory 60-1 to hold the signal held by the count signal holding unit 403-1. Similarly, the memory control unit 507 causes the memory 60-2 to hold the signal held by the count signal holding unit 403-2.

Figure 4:
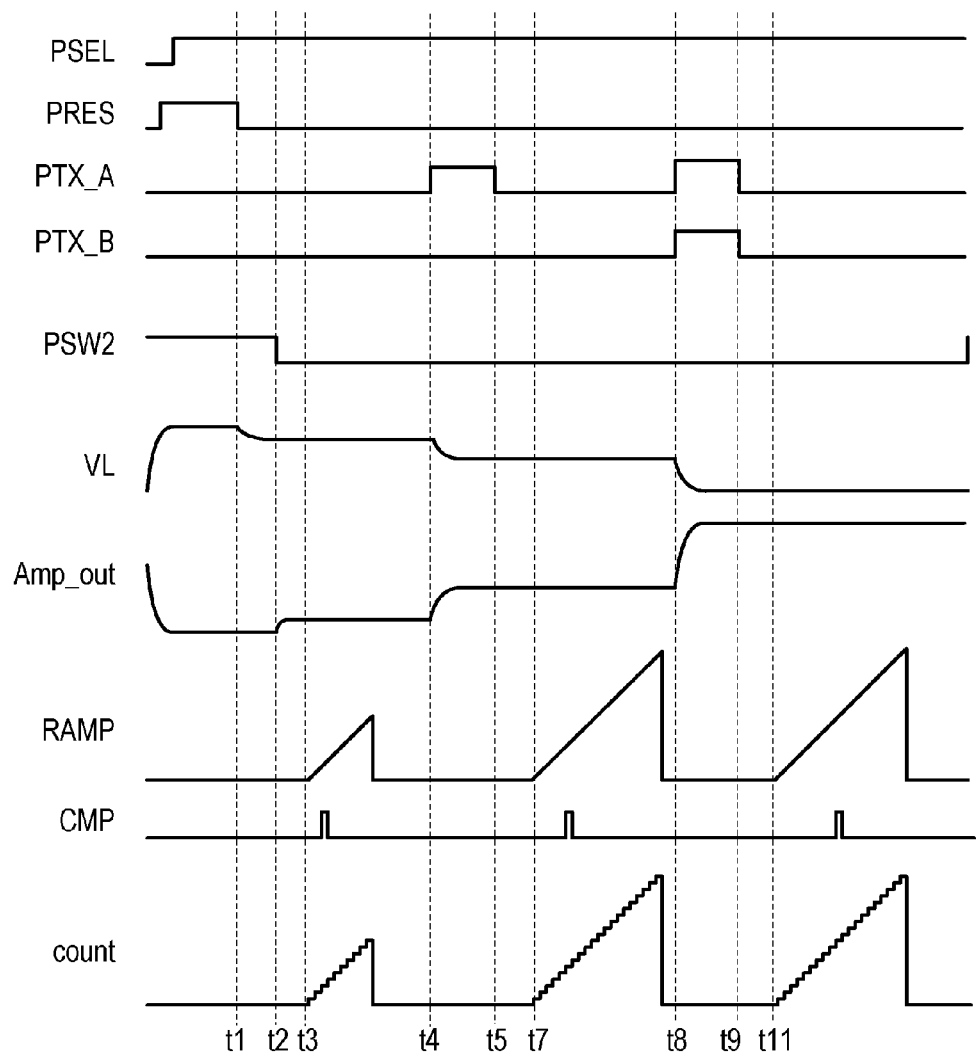
FIG. 4 shows an operation example of the imaging device.

FIG. 4 is a timing chart showing an operation of the imaging device illustrated in FIG. 3.

A value VL shown in FIG. 4 represents a signal level of the vertical signal line 15. A value Amp_out shown in FIG. 4 represents a signal level of a signal output from the inverting amplifier 301.

Initially, the vertical scanning circuit 20 sets the signal PRES to High level (hereinafter referred to as "H level", and Low level is similarly referred to as "L level"). In this condition, the potential of the input node of the transistor 207 is reset. The vertical scanning circuit 20 sets the signal PSEL to H level. In this condition, the transistor 209 outputs to the vertical signal line 15 the signal output from the transistor 207 based on the reset potential of the input node. The driving circuit 50 sets each signal PSW2 controlling the switch SW2 to H level. In this condition, each of the switches SW2 comes into the conductive state, wherefore the electric carriers in the capacitor elements C0 and C1 are reset.

The vertical scanning circuit 20 sets the signal PRES to L level at a time t1. As a result, the reset at the input node of the transistor 207 is canceled. A signal output from the transistor 209 to the vertical signal line 15 at this time is referred to as a noise signal.

The driving circuit 50 sets the signal PSW2 to L level at a time t2. As a result, the switch SW2 comes into the non-conductive state. The capacitor element C0 holds the noise signal at the time t2.

The inverting amplifier 301 amplifies a signal indicating the difference between the noise signal held by the capacitor element C0 and the signal level of the vertical signal line 15 after the time t2, and outputs the amplified signal to the comparator 401.

The ramp signal generating unit 503 starts potential change of the ramp signal RAMP dependent on time at a time t3. Simultaneously, the counter 505 starts count of clock pulses.

Thereafter, the signal value of the comparison result signal CMP output from the comparator 401 changes. The count signal holding unit 403-1 holds a count signal at this time. This count signal held by the count signal holding unit 403-1 is referred to as a digital N signal.

Thereafter, the ramp signal generating unit 503 ends potential change of the ramp signal RAMP dependent on time.

The vertical scanning circuit 20 sets the signal PTX_A to H level at a time t4. As a result, the electric carriers accumulated in the photoelectric converting unit 200-1 are transferred to the input node of the transistor 207.

The transistor 207 outputs a signal based on the electric carriers of the photoelectric converting unit 200-1 to the vertical signal line 15 via the transistor 209. The inverting amplifier 301 receives a signal indicating the difference between the signal input to the vertical signal line 15 from the transistor 207 and the noise signal. The signal indicating this difference is hereinafter referred to as an A signal. The inverting amplifier 301 amplifies the A signal and outputs the amplified A signal to the comparator 401. This signal input to the comparator 401 is hereinafter referred to as an amplified A signal.

The vertical scanning circuit 20 sets the signal PTX_A to L level at a time t5.

The ramp signal generating unit 503 starts potential change of the ramp signal RAMP dependent on time at a time t7. The comparator 401 compares the ramp signal RAMP and the amplified A signal. Simultaneously, the counter 505 starts count of clock pulses.

Thereafter, the signal value of the comparison result signal CMP output from the comparator 401 changes. The count signal holding unit 403-2 holds a count signal at this time. This count signal held by the count signal holding unit 403-2 is referred to as a digital A signal.

Thereafter, the ramp signal generating unit 503 ends potential change of the ramp signal RAMP dependent on time.

The memory control unit 507 causes the memory 60-1 to hold the digital N signal held by the count signal holding unit 403-1. Similarly, the memory control unit 507 causes the memory 60-2 to hold the digital A signal held by the count signal holding unit 403-2.

Thereafter, the horizontal scanning circuit 70 causes the memory 60-1 to output the digital N signal, and causes the memory 60-2 to output the digital A signal.

The vertical scanning circuit 20 sets the signal PTX_A to H level at a time t8. As a result, the transistor 203-1 transfers the electric carriers remaining in the photoelectric converting unit 200-1 to the transistor 207. The vertical scanning circuit 20 sets the signal PTX_B to H level. As a result, the transistor 203-2 transfers the electric carriers accumulated in the photoelectric converting unit 200-2 to the transistor 207.

The transistor 207 outputs a signal based on the sum of the electric carriers of the photoelectric converting units 200-1 and 200-2 to the vertical signal line 15 via the transistor 208. The inverting amplifier 301 receives a signal indicating the difference between the signal input to the vertical signal line 15 from the transistor 207 and the noise signal. This signal is hereinafter referred to as an A+B signal. The inverting amplifier 301 amplifies the A+B signal and outputs the amplified A+B signal to the comparator 401. The signal input to the comparator 401 is hereinafter referred to as an amplified A+B signal.

The ramp signal generating unit 503 starts potential change of the ramp signal RAMP dependent on time at a time t11. The comparator 401 compares the ramp signal RAMP and the amplified A+B signal. Simultaneously, the counter 505 starts count of clock pulses.

Thereafter, the signal value of the comparison result signal CMP output from the comparator 401 changes. The count signal holding unit 403-2 holds a count signal at this time. The count signal held by the count signal holding unit 403-2 is referred to as a digital A+B signal.

Thereafter, the ramp signal generating unit 503 ends potential change of the ramp signal RAMP dependent on time.

The memory control unit 507 causes the memory 60-2 to hold the digital A+B signal held by the count signal holding unit 403-2.

Thereafter, the horizontal scanning circuit 70 causes the memory 60-1 to output the digital N signal, and causes the memory 60-2 to output the digital A+B signal.

FIG. 5A shows the correspondence between signals output from the imaging device 154 and the pixel array 100. FIG. 5B shows the correspondence between signals output from the signal processing unit 155 and the pixel array 100. All of the pixels 10 in the rows contained in a part of the columns of the pixel array 100 in the imaging area shown in FIG. 5A are included in a phase difference detection area. The imaging device 154 outputs the digital A+B signals of the pixels 10 in all of the columns of the pixel array 100. The imaging device 154 outputs the digital A signals based on the A signals of the pixels 10 within the area determined as the phase difference detection area by the overall control/calculation unit 1510. More specifically, the horizontal scanning circuit 70 causes the memories 60-1 and the memories 60-2 in the columns based on the phase difference detection area to output the digital N signals and the digital A signals. Moreover, the horizontal scanning circuit 70 causes the memories 60-1 and the memories 60-2 in all of the columns to output the digital N signals and the digital A+B signals.

As shown in FIG. 5B, the signal processing unit 155 generates addition signals produced by adding the digital A+B signals of the respective columns output from the imaging device 154. The signal processing unit 155 generates image signals based on the addition signals. Accordingly, the imaging system in this embodiment can generate image signals with lowered resolution based on the signals output from the imaging device 154. The resolution in this context refers to the number of digital signals generated by the imaging system per unit area of the pixel array 100. It is assumed that the "resolution of signal" in this specification refers to the number of unit cells based on one signal.

Moreover, the signal processing unit 155 generates digital B signals based on the digital A signals based on the A signals of the pixels 10 within the phase difference detection area and the digital A+B signals of the pixels 10 within phase difference detection area prior to addition. Then, the signal processing unit 155 detects the phase difference of the incident light based on the digital A signals and the digital B signals. The signal processing unit 155 can detect a focus from the detected phase difference.

The imaging device according to this embodiment outputs to the signal processing unit the digital A signals based on the A signals defined as first signals of the unit cells within the phase difference detection area, and the digital A+B signals based on the A+B signals defined as second signals of the unit cells within the phase difference detection area. Besides, the imaging device according to the embodiment outputs to the signal processing unit the digital A+B signals based on the A+B signals defined as second signals of the unit cells within the imaging area. Then, the signal process-ing unit sets each of the value obtained by dividing the number of the digital A signals within the phase detection area by the number of the unit cells in the phase difference detection area, and the value obtained by dividing the number of the digital A+B signals within the phase detection area by the number of the unit cells in the phase difference detection area to a value larger than the value obtained by dividing the number of the digital A+B signals of the unit cells within the imaging area by the number of the unit cells within the imaging area. In other words, the number of the unit cells based on the one digital A+B signal after addition on which the image signal is based is larger than the number of the unit cells based on the one digital A signal on which the phase difference detection signal is based.

The imaging device according to this embodiment includes a microlens array which is not shown. The microlens array includes a plurality of microlenses. The imaging device according to this embodiment includes the photoelectric converting units 200-1 and 200-2 below the single microlens.

The signal processing unit 155 does not lower the resolution of the digital A signals output from the imaging device 154. The digital B signals generated from the signal processing unit 155 have the same resolution as that of the digital A signals. Thus, the signal processing unit 155 can produce image signals having lowered resolution while maintaining the accuracy of phase difference detection.

The imaging system according to this embodiment may further perform correlated double sampling process which obtains digital signals each indicating the difference between the digital A+B signal and the digital N signal, and digital signals each indicating the difference between the digital A signal and the digital N signal.

It is preferable that the imaging system in this embodiment adds the respective digital A+B signals of the pixels in the same colors for the plural columns when the imaging device 154 has a color filter.

According to this embodiment, each of the pixels 10 includes the two photoelectric converting units. However, in another example, each of the pixels 10 may include a larger number of photoelectric converting units.

Second Embodiment

An imaging system according to this embodiment is now described particularly in the different points from the first embodiment. The structure of the imaging system in this embodiment is similar to the structure according to the first embodiment. The one unit cell in this embodiment is the one pixel 10.

FIG. 6A shows the correspondence between signals output from the imaging device in this embodiment and the pixel array 100. FIG. 6B shows the correspondence between signals output from the signal processing unit in this embodiment and the pixel array 100.

As shown in FIG. 6A, the imaging device outputs to the signal processing unit the digital A signals, the digital A+B signals, and the digital N signals in all the columns within the phase difference detection area. On the other hand, the imaging device outputs to the signal processing unit the digital A+B signals added for the plural columns, and the digital N signals added for the plural columns within the area other than the phase difference detection area.

In FIG. 6B, the signal processing unit generates digital B signals each based on the difference between the digital A+B signal and the digital A signal within the phase difference detection area. Then, the signal processing unit detects the phase difference of the incident light based on the digital A signals and the digital B signals.

Moreover, the signal processing unit adds the digital A+B signals of the plural columns within the phase difference detection area so as to adjust the resolution of the digital A+B signals within the phase difference detection area to the resolution of the digital A+B signals in the area other than the phase difference detection area for formation of image signals.

Figure 7:
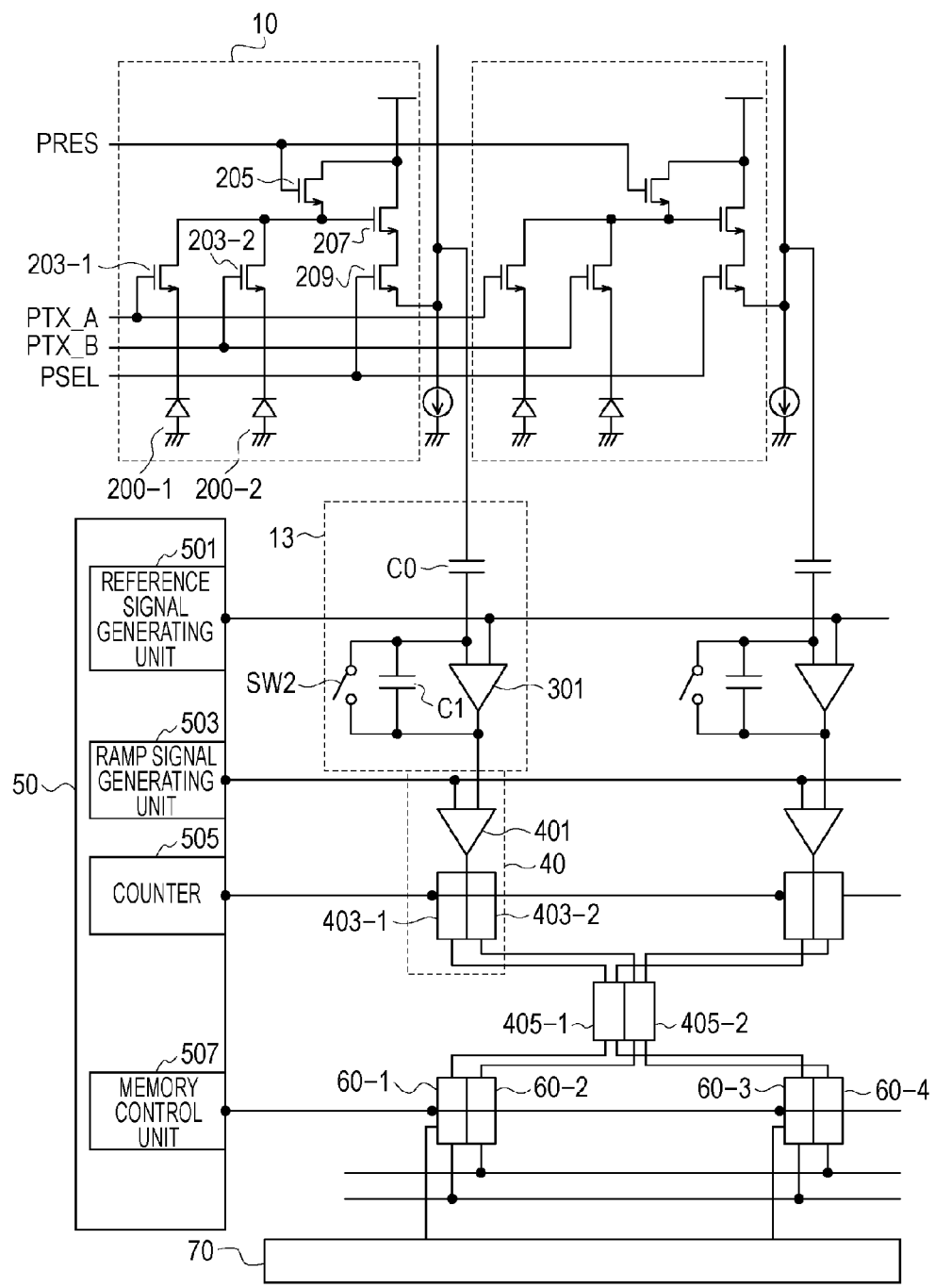
FIG. 7 illustrates a structure example of the imaging device.

FIG. 7 is a diagram showing the structure of the imaging device according to this embodiment. Components in FIG. 7 having functions similar to the corresponding components of the imaging device shown in FIG. 3 are given reference numbers similar to the corresponding reference numbers in FIG. 3.

The imaging device shown in FIG. 7 includes digital adding units 405-1 and 405-2. The digital adding unit 405-1 included in the columns of the area other than the phase detection area adds the respective digital N signals held by the count signal holding units 403-1 in the plural columns. The digital adding unit 405-2 included in the columns of the area other than the phase detection area adds the respective digital A+B signals held by the count signal holding units 403-2 in the plural columns. The memory control unit 507 causes either the memory 60-1 or the memory 60-3 to hold the added digital N signals generated by the digital adding unit 405-1. Similarly, the memory control unit 507 causes either the memory 60-2 or the memory 60-4 to hold the added digital A+B signals generated by the digital adding unit 405-2. The horizontal scanning circuit 70 causes the respective memories 60 holding the added digital N signals and the added digital A+B signals to output the respective signals.

On the other hand, the digital adding units 405-1 and 405-2 included in the phase difference detection area do not add the respective digital N signals of the plural columns, and do not add the respective digital A+B signals of the plural columns. These digital adding units 405-1 and 405-2 output the digital N signals and the digital A+B signals of the respective columns to the memories 60-1 and 60-2 in the columns associated with the corresponding pixels 10 without addition.

As discussed with reference to FIG. 7, the output shown in FIG. 6A is obtained from the imaging device.

The imaging device according to this embodiment outputs the digital A+B signals added for the plural columns in the area other than the phase difference detection area. On the other hand, the imaging device according to the first embodiment outputs the digital A+B signals for all the columns to the signal processing unit. Accordingly, the imaging device in this embodiment can shorten the horizontal scanning period for the digital A+B signals in comparison with the imaging device according to the first embodiment.

Moreover, the signal processing unit generates the digital A+B signals added for the plural columns within the phase difference detection area for formation of image signals. On the other hand, the signal processing unit according to the first embodiment adds the plural digital A+B signals for the entire area for formation of image signals. Accordingly, the imaging system according to this embodiment can reduce the load imposed on the signal processing unit.

According to the example discussed in this embodiment, the imaging device adds the respective digital A signals, and adds the respective digital A+B signals. However, in another example, the imaging device may generate analog signals produced by adding the respective A signals based on the plural pixels 10, and analog signals produced by adding the respective A+B signals based on the plural pixels 10, and convert the respective added analog signals into digital signals.

The imaging device according to this embodiment includes a microlens array which is not shown. The microlens array includes a plurality of microlenses. The imaging device according to this embodiment includes the photoelectric converting units 200-1 and 200-2 below the single microlens.

Third Embodiment

An imaging system according to this embodiment is now described particularly in the different points from the first embodiment. The structures of the imaging device and the imaging system in this embodiment are similar to the corresponding structures according to the first embodiment. The one unit cell in this embodiment is the one pixel 10.

FIG. 8A shows the correspondence between signals output from the imaging device in this embodiment and the pixel array 100. FIG. 8B shows the correspondence between signals output from the signal processing unit in this embodiment and the pixel array 100.

As shown in FIG. 8A, the imaging device outputs to the signal processing unit the digital A signals, the digital A+B signals, and the digital N signals for all the columns within the phase difference detection area. The imaging device outputs to the signal processing unit the digital A+B signals, and the digital N signals for a part of the columns in the area other than the phase difference detection area.

In FIG. 8B, the signal processing unit generates digital B signals each based on the difference between the digital A+B signal and the digital A signal within the phase difference detection area. Then, the signal processing unit detects the phase difference of the incident light based on the digital A signals and the digital B signals.

Moreover, the signal processing unit performs thinning-out which adjusts the resolution of the digital A+B signals within the phase difference detection area to the resolution of the digital A+B signals in the area other than the phase difference detection area for formation of image signals.

The imaging device according to this embodiment offers the advantage of shortening the period for outputting the digital A+B signals in comparison with the imaging device according to the first embodiment. Moreover, according to the imaging system in this embodiment, the adjustment of the resolution for formation of image signals is achieved by thinning-out of the digital A+B signals in the area other than the phase difference detection area. On the other hand, the imaging system according to the first embodiment adds the digital A+B signals for the entire area of the pixel array 100. Accordingly, the imaging system in this embodiment offers the advantage of reducing the load imposed on the signal processing unit in comparison with the imaging system according to the first embodiment.

According to this embodiment, the horizontal scanning circuit 70 causes output of the digital signals from all the columns holding the digital signals of the pixels 10 within the phase difference detection area, and causes output of the digital signals from a part of the columns holding the digital signals of the pixels 10 in the area other than the phase difference detection area. According to another example, the vertical scanning circuit 20 may cause output of pixel signals from all the rows including the pixels 10 within the phase difference detection area, and may cause output of pixel signals from a part of the rows not including the pixels 10 within the phase difference detection area.

The imaging device according to this embodiment includes a microlens array which is not shown. The microlens array includes a plurality of microlenses. The imaging device according to this embodiment includes the photoelectric converting units 200-1 and 200-2 below the single microlens.

Fourth Embodiment

An imaging system according to this embodiment is now described particularly in the different points from the third embodiment. According to the imaging device in this embodiment, the pixels 10 of all the columns contained in a part of the rows are included in the phase difference detection area. The one unit cell in this embodiment is the one pixel 10.

FIG. 9A shows the correspondence between signals output from the imaging device in this embodiment and the pixel array 100. FIG. 9B shows the correspondence between signals output from the signal processing unit in this embodiment and the pixel array 100.

As shown in FIG. 9A, the imaging device outputs to the signal processing unit the digital A signals, the digital A+B signals, and the digital N signals of all the columns within the phase difference detection area. The imaging device outputs to the signal processing unit the digital A+B signals, and the digital N signals of a part of the columns in the area other than the phase difference detection area.

In FIG. 9B, the signal processing unit generates digital B signals each based on the difference between the digital A+B signal and the digital A signal in the phase difference detection area. Then, the signal processing unit detects the phase difference of the incident light based on the digital A signals and the digital B signals.

Moreover, the signal processing unit performs thinning-out which adjusts the resolution of the digital A+B signal within the phase difference detection area to the resolution of the digital A+B signals in the area other than the phase difference detection area for formation of image signals.

Accordingly, the imaging device in this embodiment can offer advantages similar to those of the imaging device according to the third embodiment. Moreover, the imaging system in this embodiment can offer advantages similar to those of the imaging system according to the third embodiment.

The imaging device in this embodiment may add the respective digital signals of plural columns by applying the imaging device in the second embodiment. In addition, the signal processing unit in this embodiment may add the respective digital signals of plural columns as in the first and second embodiments.

According to this embodiment, the imaging device and the imaging system perform thinning-out. However, in another example, the imaging device and the imaging system may perform addition instead of thinning-out as in the first embodiment.

The imaging device according to this embodiment includes a microlens array which is not shown. The microlens array includes a plurality of microlenses. The imaging device according to this embodiment includes the photoelectric converting units 200-1 and 200-2 below the single microlens.

Fifth Embodiment

An imaging system according to this embodiment is now described particularly in the different points from the third embodiment. According to the imaging device in this embodiment, the pixels 10 in a part of the rows and in a part of the columns are included in the phase difference detection area. The one unit cell in this embodiment is the one pixel 10.

FIG. 10A shows the correspondence between signals output from the imaging device in this embodiment and the pixel array 100. FIG. 10B shows the correspondence between signals output from the signal processing unit in this embodiment and the pixel array 100.

As shown in FIG. 10A, the imaging device outputs to the signal processing unit the digital A signals, the digital A+B signals, and the digital N signals for all the columns within the phase difference detection area. The imaging device outputs to the signal processing unit the digital A+B signals, and the digital N signals for a part of the columns in the area other than the phase difference detection area.

In FIG. 10B, the signal processing unit generates digital B signals each based on the difference between the digital A+B signal and the digital A signal in the phase difference detection area. Then, the signal processing unit detects the phase difference of the incident light based on the digital A signals and the digital B signals.

Moreover, the signal processing unit performs thinning-out which adjusts the resolution of the digital A+B signal within the phase difference detection area to the resolution of the digital A+B signals in the area other than the phase difference detection area for formation of image signals.

Accordingly, the imaging device in this embodiment can offer advantages similar to those of the imaging device according to the third embodiment. Moreover, the imaging system in this embodiment can offer advantages similar to those of the imaging system according to the third embodiment.

The imaging device in this embodiment may add the respective digital signals of plural columns by applying the imaging device in the second embodiment. In addition, the signal processing unit in this embodiment may add the respective digital signals of plural columns as in the first and second embodiments.

According to this embodiment, the imaging device and the imaging system perform thinning-out. However, in another example, the imaging device and the imaging system may perform addition instead of thinning-out as in the first embodiment.

The imaging device according to this embodiment includes a microlens array which is not shown. The microlens array includes a plurality of microlenses. The imaging device according to this embodiment includes the photoelectric converting units 200-1 and 200-2 below the single microlens.

Sixth Embodiment

An imaging system according to this embodiment is now described particularly in the different points from the second embodiment. The one unit cell in this embodiment is the one pixel 10.

According to the imaging system in this embodiment, the imaging device outputs the digital A signals based on the A signals output and added for the plural rows of the pixels 10.

FIG. 11A shows the correspondence between signals output from the imaging device in this embodiment and the pixel array 100. FIG. 11B shows the correspondence between signals output from the signal processing unit in this embodiment and the pixel array 100.

As shown in FIG. 11A, the imaging device causes the memories 60 holding the digital signals of the pixels 10 in all the columns within the phase difference detection area to output to the signal processing unit the digital A signals based on the A signals output and added for the plural rows of the pixels 10. Moreover, the imaging device causes the memories 60 holding the digital signals of the pixels 10 in all the columns within the phase difference detection area to output to the signal processing unit the digital N signals based on the N signals output and added for the plural rows of the pixels 10. Furthermore, the imaging device causes the memories 60 holding the digital signals of the pixels 10 in all the columns within the phase difference detection area to output to the signal processing unit the digital A+B signals of the respective pixels 10, and the digital N signals of the respective pixels 10.

The imaging device outputs to the signal processing unit the digital A+B signals added for the plural columns, and the digital N signals added for the plural columns in the area other than the phase difference detection area.

As shown in FIG. 11B, the signal processing unit adjusts the resolution of the digital A+B signals to the resolution of the digital A signals input from the imaging device within the phase difference detection area for formation of phase difference detection signals. In other words, the signal processing unit adds the respective digital A+B signals for the plural rows within the phase difference detection area. Then, the signal processing unit generates digital B signals each based on the difference between the added digital A+B signal and the digital A signal. As a result, the resolution of the digital A signals input from the imaging device is equalized with the resolution of the digital B signals generated by the signal processing unit. Accordingly, the signal processing unit can achieve preferable phase difference detection of the incident light.

Moreover, as shown in FIG. 11B, the signal processing unit adjusts the resolution of the digital A+B signals within the phase detection area to the resolution of the digital A+B signals in the area other than the phase difference detection area for formation of image signals. In other words, the signal processing unit adds the respective digital A+B signals for the plural columns within the phase difference detection area. This function allows formation of image signals with resolution equalized between the phase difference detection area and the area other than the phase difference detection area.

This embodiment is suited for the case when the signal processing unit implements phase difference detection of incident light between columns of the pixels 10. The signal processing unit does not add the digital signals of plural columns for formation of phase difference detection signals. Accordingly, the resolution of the phase difference detection signals in the horizontal direction does not lower in comparison with the resolution obtained by using non-adding digital A signals and non-adding digital A+B signals of the respective pixels 10.

The digital A signals based on the A signals of the pixels 10 added for the plural rows may be obtained either by adding the analog A signals or by adding digital A signals. For addition of the analog A signals, the vertical scanning circuit 20 simultaneously selects the pixels 10 of the plural rows and causes the A signals of the pixels 10 for the plural rows to be input to the vertical signal lines 15. In this case, the imaging device according to this embodiment can shorten the vertical scanning period for outputting the A signals from the pixels 10 of the plural rows while preventing lowering of the accuracy of phase difference detection in comparison with an imaging device which outputs the non-adding digital A signals of the respective pixels 10.

For addition of the respective digital A signals, the imaging device may include for each column a digital adding unit which adds the respective digital A signals of the respective pixels 10 of the plural rows. In this case, the imaging device in this embodiment can decrease the number of times of horizontal scanning performed by the horizontal scanning circuit 70 while preventing lowering of the accuracy of phase difference detection in comparison with an imaging device which outputs the non-adding digital A signals of the respective pixels 10.

According to this embodiment, the imaging device and the imaging system perform addition of the respective signals based on the A signals, and addition of the respective signals based on the A+B signals. However, in another example, the imaging device and the imaging system may perform thinning-out instead of addition as in the third embodiment.

The imaging device according to this embodiment includes a microlens array which is not shown. The microlens array includes a plurality of microlenses. The imaging device according to this embodiment includes the photoelectric converting units 200-1 and 200-2 below the single microlens.

Seventh Embodiment

An imaging system according to this embodiment is now described particularly in the different points from the third embodiment. According to the third embodiment, each of the pixels 10 outputs the noise signal, the signal based on the electric carriers of the photoelectric converting unit 200-1, and the signal based on the sum of the electric carriers of the photoelectric converting units 200-1 and 200-2. According to the imaging device in this embodiment, however, each of the pixels 10 outputs the noise signal, the signal based on the electric carriers of the photoelectric converting unit 200-1, and the signal based on the electric carriers of the photoelectric converting unit 200-2. The one unit cell in this embodiment is the one pixel 10.

The structures of the imaging device and the imaging system in this embodiment are similar to the structures of the imaging device and the imaging system in the third embodiment.

Figure 12:
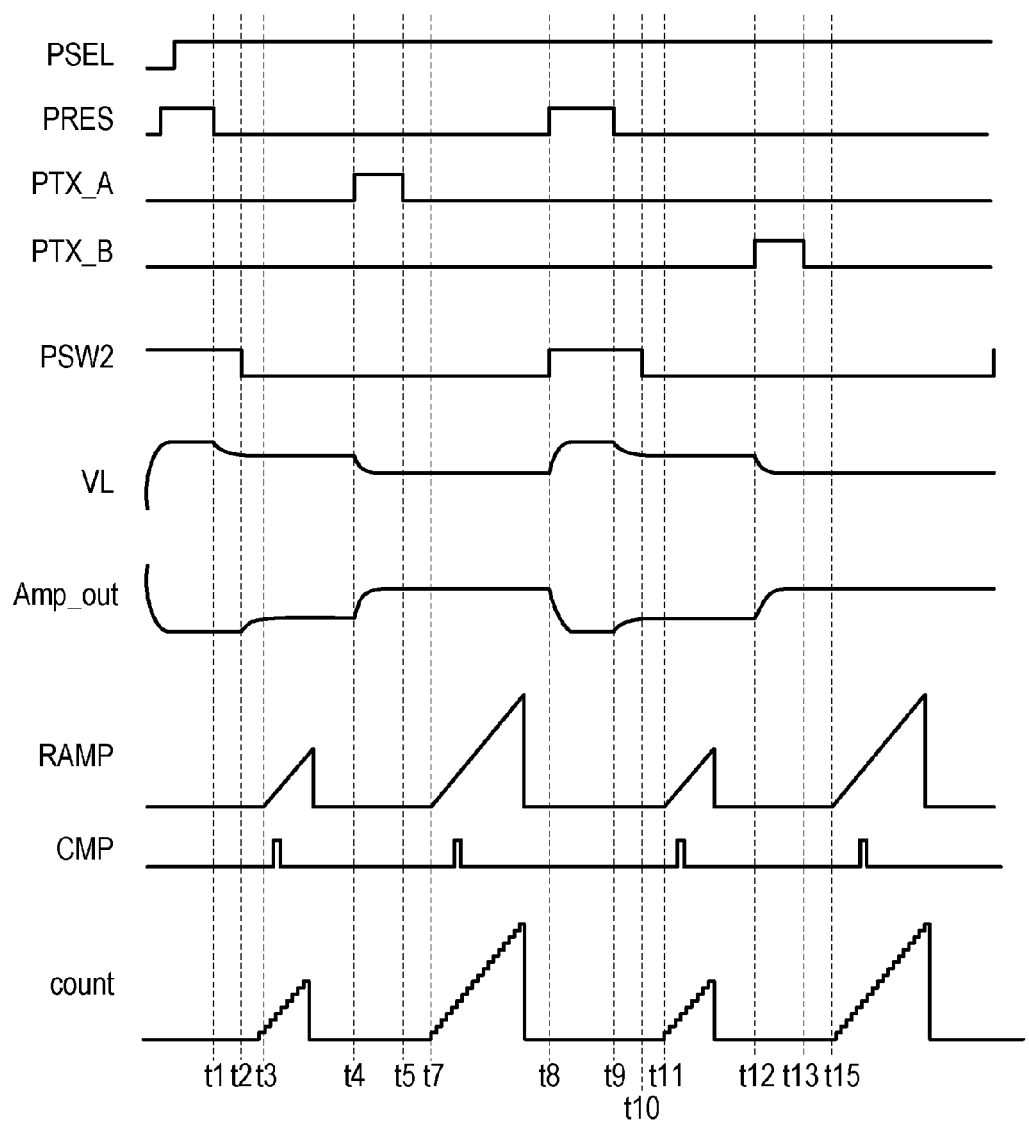
FIG. 12 shows an operation example of an imaging device.

FIG. 12 shows an operation of the imaging device according to this embodiment.

The respective actions from a time t1 to a time t7 shown in FIG. 12 are similar to the actions from the time t1 to the time t7 shown in FIG. 4. The memory control unit 507 causes the memory 60-1 to hold the digital N signal obtained by AD conversion from the time t3. This digital N signal held by the memory 60-1 is referred to as a digital N1 signal.

The vertical scanning circuit 20 sets the signal PRES to H level at a time t8. As a result, the potential of the input node of the transistor 207 is reset. The driving circuit 50 sets the signal PSW2 to H level. As a result, the electric carriers of the capacitor elements C0 and C1 are reset.

The vertical scanning circuit 20 sets the signal PRES to L level at a time t9. As a result, the reset of the potential at the input node of the transistor 207 is canceled.

The driving circuit 50 sets the signal PSW2 to L level at a time t10. The capacitor element C0 holds the electric carriers based on the noise signal.

The count signal holding unit 403-1 holds the digital N signal based on the noise signal by AD conversion from a time t11. The digital N signal held by the count signal holding unit 403-1 at this time is referred to as a digital N2 signal.

The vertical scanning circuit 20 sets the signal PTX_B to H level at a time t12. Then, the vertical scanning circuit 20 sets the signal PTX_B to L level at a time t13. As a result, the transistor 203-2 transfers the electric carriers accumulated in the photoelectric converting unit 200-2 to the input node of the transistor 207. The transistor 207 outputs a signal based on the electric carriers transferred to the input node to the vertical signal line 15 via the transistor 209. The signal input to the inverting amplifier 301 at this time corresponds to a signal obtained by subtracting the A signal from the A+B signal discussed in the first embodiment. Accordingly, the signal input to the inverting amplifier 301 at this time is hereinafter referred to as a B signal. The inverting amplifier 301 amplifies the B signal and outputs the resultant B signal to the comparator 401. The signal output from the inverting amplifier 301 is referred to as an amplified B signal.

The ramp signal generating unit 503 starts potential change of the ramp signal RAMP dependent on time at a time t15. The comparator 401 compares the ramp signal with the amplified B signal. Thereafter, the signal value of the comparison result signal CMP changes. The count signal holding unit 403-2 holds a count signal at this time. This count signal held by the count signal holding unit 403-2 corresponds to a digital B signal in this embodiment.

Figure 13A:
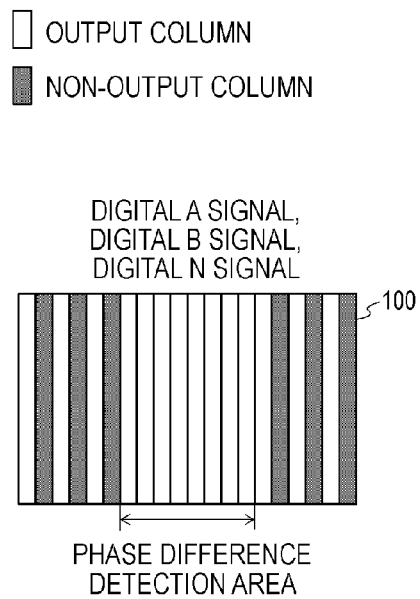
FIGS. 13A and 13B show an example of signals output from the imaging device, and an example of signals output from a signal processing unit, respectively.
Figure 13B:
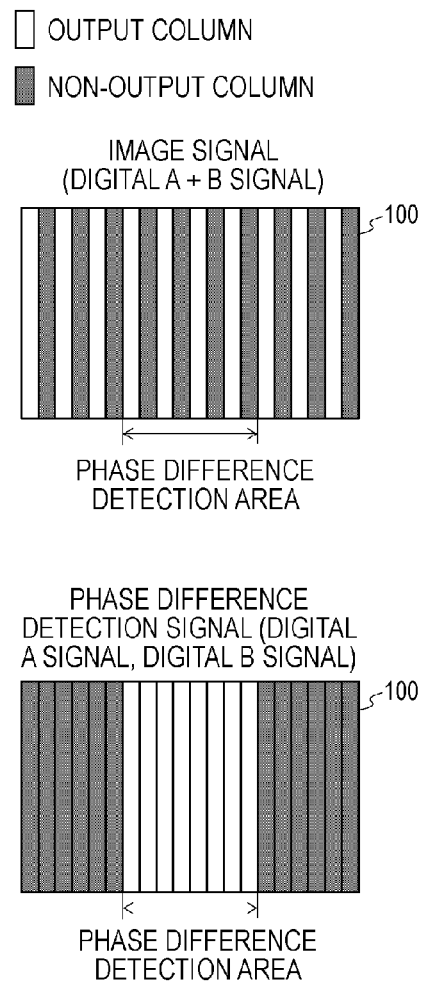

FIG. 13A shows the correspondence between signals output from the imaging device in this embodiment and the pixel array 100. FIG. 13B shows the correspondence between signals output from the signal processing unit in this embodiment and the pixel array 100.

As shown in FIG. 13A, the imaging device outputs to the signal processing unit the digital A signals, the digital B signals, and the digital N signals for all the columns within the phase difference detection area. The imaging device outputs to the signal processing unit the digital A signals, the digital B signals, and the digital N signals for a part of the columns in the area other than the phase difference detection area.

In FIG. 13B, the signal processing unit detects the phase difference of the incident light based on the digital A signals and the digital B signals within the phase difference detection area.

Moreover, the signal processing unit performs thinning-out which adjusts the respective resolutions of the digital A signals and the digital B signals within the phase difference detection area to the respective resolutions of the digital A signals and the digital B signals in the area other than the phase difference detection area for formation of image signals. Then, the signal processing unit generates digital A+B signals with resolution equalized between the phase difference detection area and the area other than then phase difference detection area by using the digital A signals and the digital B signals within the phase difference detection area after thinning-out and the digital A signals and the digital B signals in the area other than the phase difference detection area. Thereafter, the signal processing unit forms image signals using the generated digital A+B signals.

Accordingly, the imaging device and the imaging system in this embodiment offer advantages similar to those of the third embodiment.

According to this embodiment, the imaging device and the imaging system perform thinning-out. However, in another example, the imaging device and the imaging system may perform addition instead of thinning-out as in the first embodiment.

The imaging device according to this embodiment includes a microlens array which is not shown. The microlens array includes a plurality of microlenses. The imaging device according to this embodiment includes the photoelectric converting units 200-1 and 200-2 below the single microlens.

Eighth Embodiment

An imaging system according to this embodiment is now described particularly in the different points from the third embodiment. According to the third embodiment, each of the pixels 10 includes the plural photoelectric converting units. According to the imaging device in this embodiment, however, each of the pixels 10 includes one photoelectric converting unit.

Figure 14:
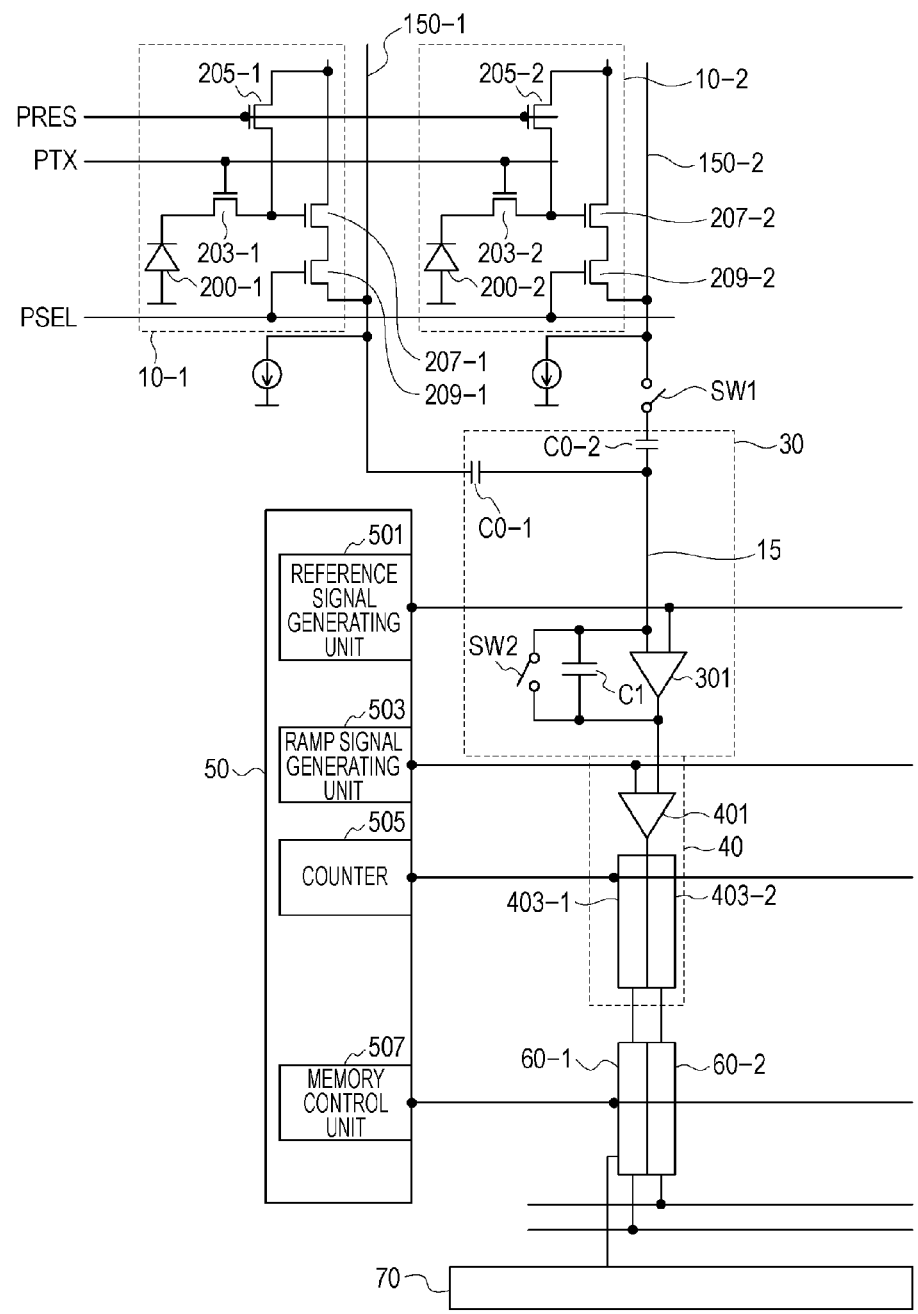
FIG. 14 illustrates a structure example of an imaging device.

FIG. 14 illustrates the imaging device according to this embodiment. Components in FIG. 14 having functions similar to the corresponding functions of the imaging device shown in FIG. 3 are given reference numbers similar to the corresponding reference numbers in FIG. 3.

A pixel 10-1 includes the photoelectric converting unit 200-1, the transistor 203-1, and transistors 205-1 and 207-1. A pixel 10-2 includes the photoelectric converting unit 200-2, the transistor 203-2, and transistors 205-2 and 207-2. The transistor 207-1 is an output unit outputting a signal based on the electric carriers of the photoelectric converting unit 200-1. The transistor 209-1 outputs the signal received from the transistor 207-1 to a sub signal line 150-1. The signal input from the transistor 209-1 to the sub signal line 150-1 is further input to the inverting amplifier 301 via the capacitor element C0-1 and the vertical signal line 15.

The transistor 207-2 is an output unit outputting a signal based on the electric carriers of the photoelectric converting unit 200-2. The transistor 209-2 outputs the signal received from the transistor 207-2 to a sub signal line 150-2. The signal input from the transistor 209-2 to the sub signal line 150-2 is further input to the inverting amplifier 301 via a switch SW1, the capacitor element C0-2 and the vertical signal line 15.

The imaging device according to this embodiment includes a microlens array which is not shown. The microlens array includes a plurality of microlenses. The imaging device according to this embodiment includes the pixels 10-1 and 10-2 below the single microlens. The one unit cell in this embodiment is constituted by the pixels 10-1 and 10-2. The one unit cell includes the plural photoelectric converting units 200-1 and 200-2.

Figure 15:
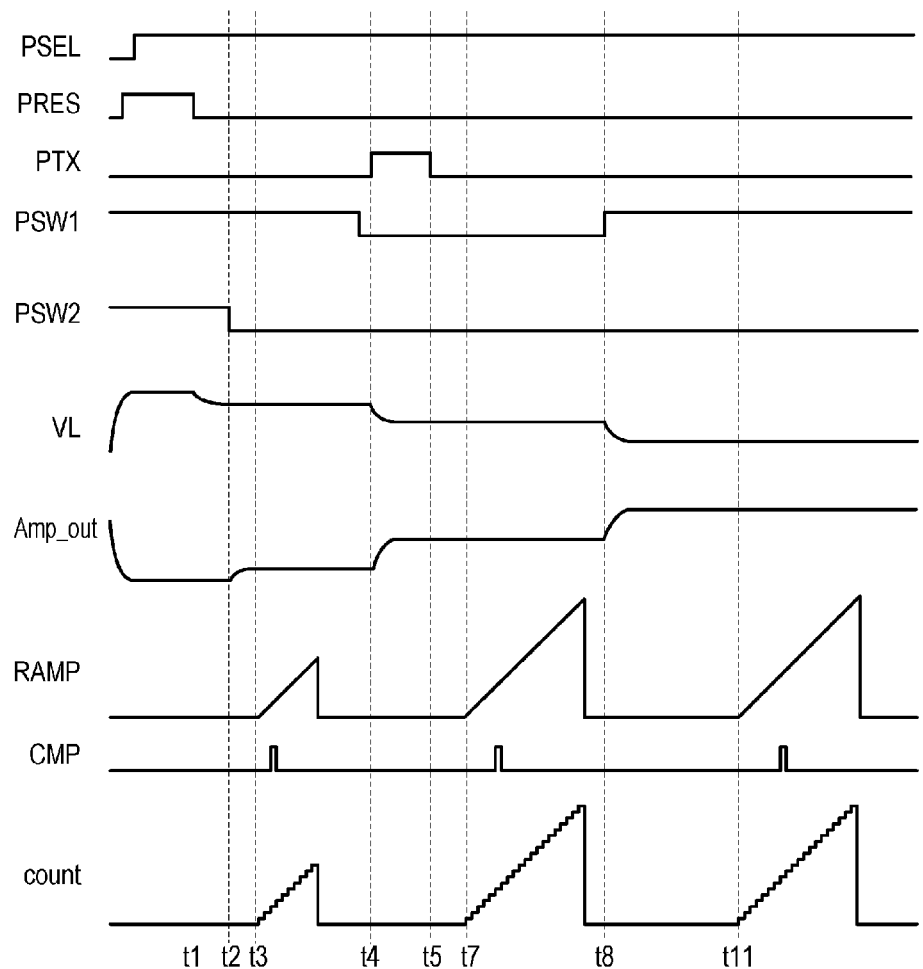
FIG. 15 shows an operation example of the imaging device.

FIG. 15 shows an operation of the imaging device illustrated in FIG. 14. A signal PSW1 corresponds to a signal for controlling the switch SW1 under the control of the driving circuit 50.

Initially, the vertical scanning circuit 20 sets the signal PRES to H level. As a result, the potentials of the input nodes of the transistors 207-1 and 207-2 are reset. Moreover, the vertical scanning circuit 20 sets the signal PSEL to H level. As a result, the transistors 209-1 and 209-2 output the signals received from the transistors 207-1 and 207-2 to the sub signal lines 150-1 and 150-2.

The vertical scanning circuit 20 sets the signal PRES to L level at a time t1 to cancel the reset of the potentials at the input nodes of the transistors 207-1 and 207-2.

The driving circuit 50 sets the signal PSW2 to L level at a time t2. The capacitor elements C0-1 and C0-2 hold the electric carriers based on the potentials of the sub signal lines 150-1 and 150-2, respectively.

The ramp signal generating unit 503 starts potential change of the ramp signal RAMP dependent on time at a time t3. When the signal value of the comparison result signal CMP changes after the time t3, the count signal holding unit 403-1 holds a count signal. This count signal held by the count signal holding unit 403-1 corresponds to a digital N signal in this embodiment.

Thereafter, the driving circuit 50 sets the signal PSW1 to L level.

The vertical scanning circuit 20 sets a signal PTX to H level at a time t4. As a result, the transistor 203-1 transfers the electric carriers accumulated in the photoelectric converting unit 200-1 to the input node of the transistor 207-1. The transistor 203-2 transfers the electric carriers accumulated in the photoelectric converting unit 200-2 to the input node of the transistor 207-2. Since the switch SW1 is in the non-conductive state, the signal output from the transistor 209-2 is not input to the inverting amplifier 301. The signal output from the transistor 209-1 is input to the inverting amplifier 301 via the capacitor element C0-1. The signal input to the inverting amplifier 301 at this time corresponds to an A signal in this embodiment.

The ramp signal generating unit 503 starts potential change of the ramp signal RAMP dependent on time at a time t7. When the signal value of the comparison result signal CMP changes after the time t7, the count signal holding unit 403-2 holds a count signal. This count signal held by the count signal holding unit 403-2 corresponds to a digital A signal in this embodiment. The memory control unit 507 causes the memory 60-1 to hold the digital N signal, and causes the memory 60-2 to hold the digital A signal.

The driving circuit 50 sets the signal PSW1 to H level at a time t8. As a result, the signals output from the transistors 207-1 and 207-2 are input to the inverting amplifier 301 via the capacitor elements C0-1 and C0-2, respectively. The signals input to the inverting amplifier 301 correspond to an A+B signal in this embodiment.

The ramp signal generating unit 503 starts potential change of the ramp signal RAMP dependent on time at a time t11. When the signal value of the comparison result signal CMP changes after the time t11, the count signal holding unit 403-2 holds a count signal. This count signal held by the count signal holding unit 403-2 corresponds to a digital A+B signal in this embodiment.

The signals output from the imaging device, and the signals output from the signal processing unit in this embodiment may be similar to the corresponding signals according to the third embodiment.

Accordingly, the imaging device and the imaging system in this embodiment offer advantages similar to those of the imaging device and the imaging system according to the third embodiment.

According to this embodiment, the imaging device and the imaging system perform thinning-out. However, in another example, the imaging device and the imaging system may perform addition instead of thinning-out as in the first embodiment.

According to this embodiment, the signals output from the pixels 10 in two columns are input to the one inverting amplifier 301. However, in another example, the signal output from the pixel 10 in one column may be input to the one inverting amplifier 301. In this case, the A+B signal may be generated by adding signals output from the inverting amplifiers 301 in plural columns, or generated outside the imaging device.

Ninth Embodiment

An imaging system according to this embodiment is now described particularly in the different points from the third embodiment.

The imaging device according to this embodiment outputs analog amplified A signals and analog amplified A+B signals to the signal processing unit.

Figure 16:
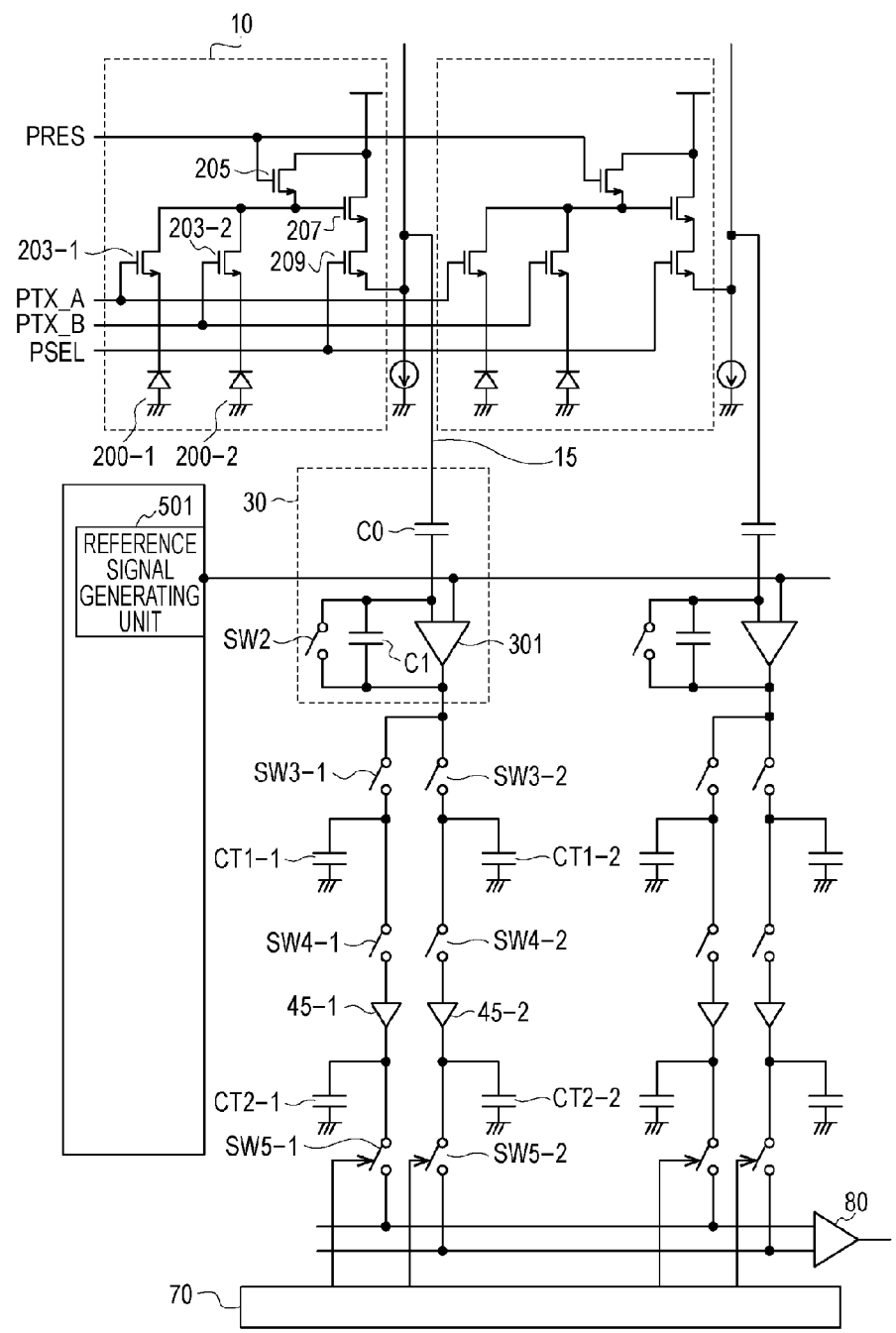
FIG. 16 illustrates a structure example of an imaging device.

FIG. 16 is a diagram showing the structure of the imaging device according to this embodiment. Components in FIG. 16 having functions similar to the corresponding functions of the imaging device shown in FIG. 3 are given reference numbers similar to the corresponding reference numbers in FIG. 3. The one unit cell in this embodiment is the one pixel 10.

A signal output from the inverting amplifier 301 is input to capacitor elements CT1-1 and CT1-2 via switches SW3-1 and SW3-2. The signals received by the capacitor elements CT1-1 and CT1-2 are input to capacitor elements CT2-1 and CT2-2 via switches SW4-1 and SW4-2 and buffers 45-1 and 45-2. When the horizontal scanning circuit 70 brings switches SW5-1 and SW5-2 into the conductive state, the signals held by the capacitor elements CT2-1 and CT2-2 are input to a differential amplifier 80. The differential amplifier 80 amplifies a signal indicating the difference between the signals held by the capacitor elements CT2-1 and CT2-2, and outputs the amplified signal to a signal processing unit outside the imaging device.

Figure 17:
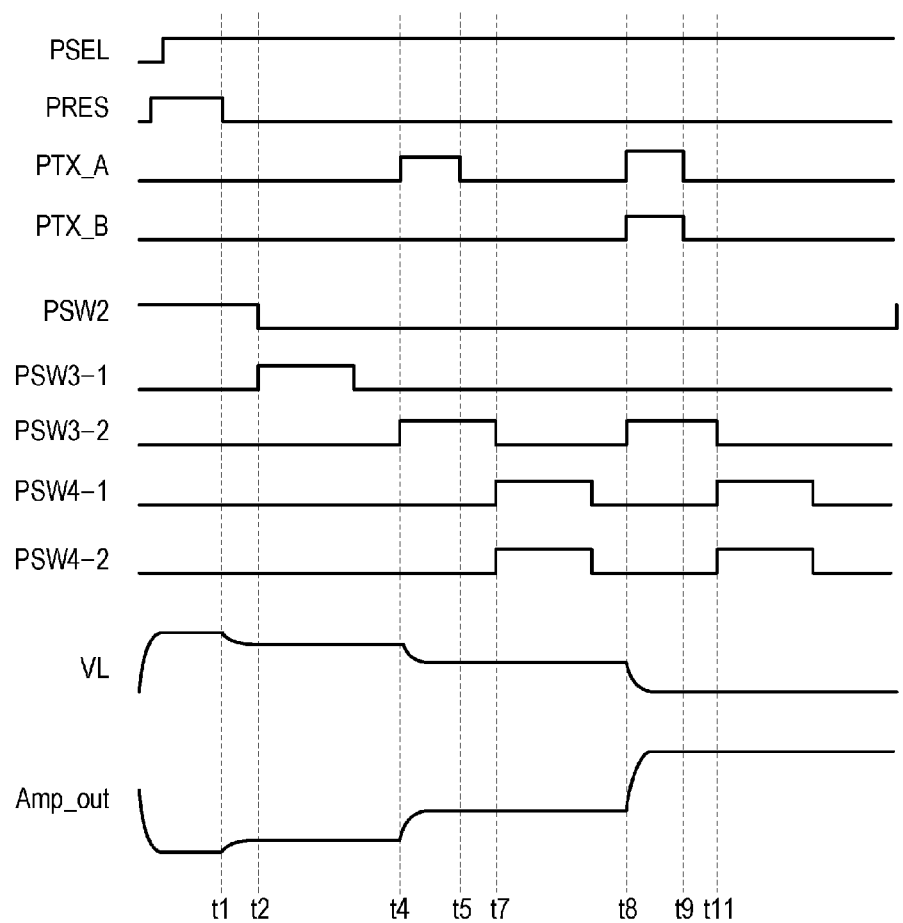
FIG. 17 shows an operation example of the imaging device.

FIG. 17 shows an operation of the imaging device shown in FIG. 16.

A signal PSW3-1 is a signal for controlling the switch SW3-1 under the control of the driving circuit 50. A signal PSW3-2 is a signal for controlling the switch SW3-2 under the control of the driving circuit 50. A signal PSW4-1 is a signal for controlling the switch SW4-1 under the control of the driving circuit 50. A signal PSW4-2 is a signal for controlling the switch SW4-2 under the control of the driving circuit 50.

The driving circuit 50 sets the signal PSW3-1 to H level at a time t2, and then sets this signal to L level. As a result, the capacitor element CT1-1 holds a signal produced by amplifying a noise signal using the inverting amplifier 301. This signal is referred to as an amplified N signal.

The driving circuit 50 sets the signal PSW3-2 to H level at a time t4, and then sets this signal to L level. As a result, the capacitor element CT1-2 holds the amplified A signal. Thereafter, the driving circuit 50 sets the signal PSW3-2 to L level.

The driving circuit 50 sets each of the signals PSW4-1 and PSW4-2 to H level at a time t7, and then sets these signals to L level. As a result, the capacitor element CT2-1 holds the amplified N signal, while the capacitor element CT2-2 holds the amplified A signal. Thereafter, the horizontal scanning circuit 70 brings each of the switches SW5-1 and SW5-2 into the conductive state. As a result, the differential amplifier 80 amplifies a signal indicating the difference between the amplified A signal and the amplified N signal, and outputs the amplified signal to the signal processing unit.

The driving circuit 50 sets the signal PSW3-2 to H level at a time t8, and then sets this signal to L level. As a result, the capacitor element CT1-2 holds the amplified A+B signal.

The driving circuit 50 sets each of the signals PSW4-1 and PSW4-2 to H level at a time t11, and then sets these signals to L level. As a result, the capacitor element CT2-1 again holds the amplified N signal. The capacitor element CT2-2 holds the amplified A+B signal.

Thereafter, the horizontal scanning circuit 70 brings each of the switches SW5-1 and SW5-2 into the conductive state. As a result, the differential amplifier 80 amplifies a signal indicating the difference between the amplified A+B signal and the amplified N signal, and outputs the amplified signal to the signal processing unit.

The imaging device according to the third embodiment outputs the digital A signal, the digital N signal, and the digital A+B signal to the signal processing unit. According to this embodiment, the imaging device amplifies a signal indicating the difference between the amplified A signal and the amplified N signal, and a signal indicating the difference between the amplified A+B signal and the amplified N signal, and outputs these amplified signals indicating the respective differences to the signal processing unit. Other points in this embodiment are similar to the corresponding points shown in FIG. 8A. The signal processing unit generates signals similar to the corresponding signals shown in FIG. 8B except for the signals input from the imaging device to the signal processing unit and converted into digital signals on the signal processing unit side.

Accordingly, the imaging device and the imaging system in this embodiment offer advantages similar to those of the imaging device and the imaging system according to the third embodiment.

According to this embodiment, the imaging device and the imaging system perform thinning-out. However, in another example, the imaging device and the imaging system may perform addition instead of thinning-out as in the first embodiment.

The imaging device according to this embodiment includes a microlens array which is not shown. The microlens array includes a plurality of microlenses. The imaging device according to this embodiment includes the photoelectric converting units 200-1 and 200-2 below the single microlens.

Accordingly, the method of the invention can prevent lowering of the accuracy of phase difference detection caused by reduction of the resolution of image signals generated based on signals output from an imaging device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A driving method of an imaging device which includes a pixel array in which unit cells each including a first photoelectric converting unit and a second photoelectric converting unit are arranged in rows and columns, the first photoelectric converting unit and the second photoelectric converting unit being provided in correspondence with one microlens and each accumulating electric carriers based on incident light, the driving method comprising:

causing the imaging device to generate first signals each based on the electric carriers of the first photoelectric converting unit and the second photoelectric converting unit in corresponding one of the unit cells;

causing the imaging device to output signals which are obtained by adding the first signals output from each of m (m is two or more) number of unit cells among the unit cells, the m number of unit cells included in a first area being a partial area of the pixel array; and causing the imaging device to output signals which are obtained by adding the first signals output from each of n (n is smaller than m) number of unit cells among the unit cells, the n number of unit cells included in a second area being another partial area of the pixel array, or output the first signals each output from a corresponding one of the unit cells included in the other partial area.

2. The driving method of the imaging device according to claim 1, wherein the first signals are generated in the pixel array.

3. The driving method of the imaging device according to claim 2,
wherein each of the plurality of unit cells include an amplifying transistor having an input node, a first transistor provided in an electric path between the first photoelectric converting unit and the input node, and a second transistor provided in an electric path between the second photoelectric converting unit and the input node,
wherein the electric carriers of the first photoelectric converting unit and the electric carriers of the second photoelectric converting unit are summed at the input node, and
wherein the amplifying transistor outputs the first signal.

4. The driving method of the imaging device according to claim 1, wherein a signal processing circuit provided outside the pixel array outputs the first signals.

5. The driving method of the imaging device according to claim 1, further comprising:
causing the imaging device to generate second signals each based on the electric carriers of the first photoelectric converting unit in corresponding one of the unit cells,
causing the imaging device not to output the second signal of unit cells included in the first area; and
causing the imaging device to output the second signal of unit cells included in the second area.

6. A driving method of an imaging system including the imaging device driven by the driving method according to claim 5 and a signal processing unit to which signals are input from the imaging device, the driving method comprising:
causing the signal processing unit to generate phase difference detection signals by using signals based on the electric carriers of the first photoelectric converting unit and signals based on the electric carriers of the second photoelectric converting unit; and
causing the signal processing unit to generate image signals for generating an image by using signals based on the sum of the electric carriers of the first photoelectric converting unit and the electric carriers of the second photoelectric converting unit.

7. The driving method of the imaging device according to claim 1,
wherein the imaging device includes AD converting units each provided in correspondence with one of the columns, and
wherein the first signal is obtained by the AD converting unit performing AD conversion on a signal based on the electric carriers of the first photoelectric converting unit.

8. The driving method of the imaging device according to claim 1, wherein the second area is a phase difference detection area.

9. A driving method of an imaging device which includes a pixel array in which unit cells each including a first photoelectric converting unit and a second photoelectric converting unit are arranged in rows and columns, the first photoelectric converting unit and the second photoelectric converting unit being provided in correspondence with one microlens and each accumulating electric carriers based on incident light, the driving method comprising:
causing the imaging device to generate first signals each based on the electric carriers of the first photoelectric converting unit and the second photoelectric converting unit in corresponding one of the unit cells,
causing the imaging device to generate second signals each based on the electric carriers of the first photoelectric converting unit in corresponding one of the unit cells,
causing the imaging device not to output the second signals each corresponding to one of unit cells of a first group included in a first area being a partial area of the pixel array, and to output the first signal of only one or some of the unit cells of the first group,
causing the imaging device to output the first signals and the second signals each corresponding to one of unit cells of a second group included in a second area being another partial area of the pixel array.

10. A driving method of an imaging system including the imaging device driven by the driving method according to claim 9 and a signal processing unit to which signals are input from the imaging device, the driving method comprising:
causing the signal processing unit to generate phase difference detection signals by using signals based on the electric carriers of the first photoelectric converting unit and signals based on the electric carriers of the second photoelectric converting unit; and
causing the signal processing unit to generate image signals for generating an image by using signals based on the sum of the electric carriers of the first photoelectric converting unit and the electric carriers of the second photoelectric converting unit.

11. The driving method of the imaging device according to claim 10,
wherein the plurality of unit cells are arranged in a plurality of columns,
wherein the imaging device further includes
a plurality of signal holding units each provided in correspondence with one of the plurality of columns, and
a scanning circuit configured to scan the plurality of signal holding units, and
output the first signal from only one or some of the signal holding units holding the first signals output from unit cells of the first area.

12. The driving method of the imaging device according to claim 9, wherein the second area is a phase difference detection area.

* * * * *